(12) United States Patent
Geraets et al.

(10) Patent No.: US 11,391,266 B2
(45) Date of Patent: Jul. 19, 2022

(54) METHOD FOR ASSEMBLING A WIND TURBINE AND A WIND TURBINE SYSTEM

(71) Applicant: Sense Wind Limited, Cambridge (GB)

(72) Inventors: Patrick Geraets, Cambridge (GB); George Ballard, Cambridge (GB)

(73) Assignee: Sense Wind Limited, Cambridge (GB)

( * ) Notice: Subject to any disclaimer, the term of this patent is extended or adjusted under 35 U.S.C. 154(b) by 102 days.

(21) Appl. No.: 16/606,706

(22) PCT Filed: Apr. 19, 2018

(86) PCT No.: PCT/GB2018/051031
§ 371 (c)(1),
(2) Date: Oct. 18, 2019

(87) PCT Pub. No.: WO2018/193260
PCT Pub. Date: Oct. 25, 2018

(65) Prior Publication Data
US 2020/0056592 A1 Feb. 20, 2020

(30) Foreign Application Priority Data
Apr. 21, 2017 (GB) ...................................... 1706390

(51) Int. Cl.
*F03D 13/10* (2016.01)
*F03D 13/40* (2016.01)
*F03D 80/50* (2016.01)
*F03D 80/80* (2016.01)

(52) U.S. Cl.
CPC ............. *F03D 13/10* (2016.05); *F03D 13/40* (2016.05); *F03D 80/50* (2016.05); *F03D 80/88* (2016.05); *F05B 2230/6102* (2013.01); *F05B 2240/14* (2013.01); *F05B 2240/931* (2013.01)

(58) Field of Classification Search
CPC ...................................................... F03D 80/88
See application file for complete search history.

(56) References Cited

U.S. PATENT DOCUMENTS

| 6,614,125 B2 * | 9/2003 | Willis ..................... F03D 13/20 290/55 |
| 6,888,264 B1 | 5/2005 | Willis et al. |
| 2009/0257697 A1 * | 10/2009 | Andersen ................ F16C 33/51 384/455 |
| 2012/0328442 A1 | 12/2012 | Davis |

FOREIGN PATENT DOCUMENTS

| WO | WO-2010/048560 | 4/2010 |
| WO | WO-2011/141748 | 11/2011 |

OTHER PUBLICATIONS

International Search Report and Written Opinion in PCT/GB2018/051031 dated Nov. 7, 2018 (13 pages).

* cited by examiner

*Primary Examiner* — Juan G Flores
(74) *Attorney, Agent, or Firm* — Foley & Lardner, LLP

(57) ABSTRACT

A method for assembling a wind turbine, including: attaching an elevator carriage (27) to a nacelle (9) to form a carriage-nacelle assembly (27,9); and mounting the carriage-nacelle assembly (27,9) on to a tower (3) as a unit.

22 Claims, 11 Drawing Sheets

METHOD FOR ASSEMBLING A WIND TURBINE AND A WIND TURBINE SYSTEM

CROSS-REFERENCE TO RELATED APPLICATIONS

This application is a U.S. National Phase Application under 35 U.S.C. § 371 of International Application No. PCT/GB2018/051031, filed on Apr. 19, 2018, which claims the benefit of priority to GB Patent Application No. 1706390.0, filed on Apr. 21, 2017, which are each incorporated herein by reference in their entireties for any and all purposes.

The present invention relates to a method for assembling a wind turbine and a wind turbine system. The invention also relates to a vessel, such as a ship, that can be used to transport a rotor-nacelle assembly; an elevator carriage for a wind turbine; and a method for servicing a wind turbine.

Installing wind turbines is a high risk, high cost element of every wind energy project, particularly offshore wind projects. How this is carried out, the equipment used, the processes and the planning are key to meeting project programmes and budgets.

Offshore wind projects are now being developed at greater capacities on sites further away from shore and in deeper waters, using larger turbines. These developments pose additional technical challenges for their cost effective installation as well as for servicing and replacing major components during the operational life of the project.

To date the development trajectory for the installation of offshore turbines has been to deploy ever larger jack up crane vessels with the capacity to operate in deeper waters, but they are very expensive and there is a limit to the maximum water depth which is technically and commercially feasible. In some areas now being developed, coastal water depths quickly exceed the current 60 m limit for jack up vessels and it is impractical to use this method of installation. The alternative solution of using a large semi-submersible crane vessel is even more expensive than jack up vessels and less available.

Also, due to changeable weather conditions offshore, and the impact of wind and waves on the installation process, there is often a relatively short period of time available for installing wind turbines. Wind and waves in particular can cause difficulties when transferring a rotor-nacelle assembly from the vessel to the tower and shortens further the window of opportunity for installation. Accordingly it is desirable to have an improved means for transferring the rotor-nacelle assembly to the tower that mitigates the effect of wind and waves on the vessel to some extent.

Similar problems occur for installing wind turbines on land. Larger towers can make it difficult to raise and mount the rotor-nacelle assembly on to the tower and there is a strong desire to increase the speed with which a wind turbine is installed to improve the economics of the windfarm. There are also difficulties in accessing turbines for the purposes of maintenance and repair.

Accordingly a new approach is needed for the transport, installation and servicing of the turbines.

To address some of these issues, it has been proposed to use an elevator system to raise a rotor-nacelle assembly from the base of a tower to the top of the tower and rotate the rotor-nacelle assembly into position, for example see U.S. Pat. No. 6,888,264 and US2012/0328442. These arrangements are intended for land based wind turbines, however an integrated transfer system from the delivery vehicle to the top of the tower has not been satisfactorily resolved. In these examples an elevator carriage is attached to rails at the base of the tower. A nacelle is attached to the elevator carriage, a rotor is mounted on top of the nacelle to complete the rotor-nacelle assembly. The rotor hub faces generally upwards. Thus the nacelle has a generally vertical orientation. The rotor blades have a generally horizontal orientation. The elevator then lifts the rotor-nacelle assembly to the top of the tower and rotates the rotor-nacelle assembly through approximately 90 degrees. The turbine is fixed in place to the top of the tower. This method has been proposed in the context of onshore towers since it is possible to deliver component parts by lorry, and provide cranes to undertake an on-site assembly process to construct the rotor-nacelle assembly, however the method is less suitable for use in the context of offshore towers where it is much more difficult to undertake an on-site assembly process. Also, due to the effect of wind and waves and poor weather conditions, there is usually a very limited time frame for assembling wind turbines and therefore the elevator concept needs to be recast in order to make the general approach better suited to offshore contexts.

A further problem with the known systems, is the manner in which the rotor-nacelle assembly is supported by the elevator carriage. The manner in which the rotor-nacelle assembly is supported by the elevator carriage has a significant effect in the magnitude of driving force required in order to rotate the nacelle from a vertical orientation to a horizontal orientation.

A further problem with known systems, is that the majority of towers have a narrower top than base. Accordingly elevator rails mounted on to the tower may have a larger gap between them towards the base of the tower and a smaller gap between them at the top of the tower. Any drive system used by the elevator may account for this issue.

Of course, while any such refinements are mainly directed to the offshore context, it will be appreciated by the skilled person that the refinements may also be applicable to onshore wind farms.

Accordingly the present invention seeks to provide a method for assembling a wind turbine and wind turbine system that mitigates at least one of the aforementioned problems, or at least provides an alternative to existing systems.

According to one aspect of the invention there is provided a method for assembling a wind turbine, including: attaching an elevator carriage to a nacelle to form a carriage-nacelle assembly; and mounting the carriage-nacelle assembly on to the tower.

The invention provides a pre-assembled carriage-nacelle assembly (with or without a rotor), that is mounted on to the side of the tower as a unit. That is, the nacelle is mounted on to the tower after the elevator carriage is attached to the nacelle. This speeds up the assembly process on site. The invention can be used for onshore and offshore wind turbines. The invention is particularly applicable to offshore wind turbines since there is often a limited window of opportunity for assembling wind turbines due to changeable weather conditions. The invention provides a new solution not only for transporting and installing rotor-nacelle assemblies, but also facilitates servicing wind turbines, with the purpose making both the installation and servicing faster, safer and more economic than both present crane systems and any proposed elevator system. It allows the rotor-nacelle assembly of the turbine to be installed and removed without the requirement for a large crane vessel and within short weather windows. The invention is particularly competitive where turbines are installed in deep waters and/or in locations far from shore. This matches the current growth in offshore wind development in many parts of the world which is increasingly moving towards both deeper water and further offshore. The invention is increasingly desirable as turbines become larger and are mounted on taller towers. This is because larger turbines require special equipment to install them, such as taller cranes, larger vessels, etc. This special equipment requires more investment to install the wind farm, which increases risk. It also means that there is likely to be less specialist equipment available to install wind farms.

The method can include transporting the carriage-rotor-nacelle assembly to the tower as a unit. For example, the carriage-nacelle assembly can be assembled at a manufacturing site and is then transported as a unit to the wind turbine tower. Alternatively, the nacelle, a rotor hub, rotor blades and elevator carriage can be transported as separate component parts to the tower. For a land based tower, the nacelle, rotor hub, rotor blades and elevator carriage can be transported to the tower by lorry. At least the carriage and nacelle are preassembled into a carriage-nacelle assembly prior to attaching to the tower.

The method can include attaching a rotor to the nacelle, and mounting the carriage-rotor-nacelle assembly to the tower. Thus the method provides for mounting a carriage-rotor-nacelle assembly to the tower as a unit. That is, the carriage-rotor-nacelle assembly is manufactured prior to mounting the assembly to the tower. This is the preferred method for offshore installations.

The tower can be located offshore, and the method includes transporting the carriage-nacelle assembly, or carriage-rotor-nacelle assembly, by a vessel, such as a ship, to the tower, and transferring the carriage-nacelle assembly, or carriage-rotor-nacelle assembly, from the vessel to the tower. In preferred embodiments the vessel is essentially a conventional ship that has been modified to transport at least one assembly. That is, according to the invention, the vessel does not have to be a jack up crane vessel or a large semi-submersible crane vessel.

The vessel can include a platform system for transferring the carriage-nacelle assembly, or carriage-rotor-nacelle assembly, from the vessel to an offshore wind turbine tower. In preferred embodiments the platform system, includes: a movable platform, a control system, at least one actuator and at least one sensor, wherein the control system is arranged to automatically control operation of the at least one actuator to adjust the orientation of the movable platform in response to signals received from the at least one sensor. The control system is arranged to account for movement of the vessel, for example caused by wind and waves during a transfer. Thus the platform system automatically adjusts the orientation of the movable platform while transferring the carriage-nacelle assembly, or carriage-rotor-nacelle assembly, from the vessel to the offshore tower. The movable platform control system controls positioning of the platform such that the platform is held substantially motionless relative to the tower irrespective of the motion of the vessel to which it is attached. This accounts for motion of the vessel during a transfer.

The method can include mounting the carriage-nacelle assembly, or carriage-rotor-nacelle assembly, on a movable support located on the vessel, using the movable support to move the carriage-nacelle assembly, or carriage-rotor-nacelle assembly, from a storage position to the movable platform, and transferring the carriage-nacelle assembly, or carriage-rotor-nacelle assembly, from the movable platform to the tower. The movable support is mounted on rails. In preferred embodiments the movable support is movable along the vessel in a longitudinal direction. The movable platform can be mounted towards one end of the vessel, and preferably towards the stern of the vessel. In some embodiments the movable platform can be mounted towards a longitudinal side of the vessel, for example towards the port or starboard side of the vessel. The movable platform can be arranged as a gang plank such that it overhangs an edge of the vessel. A ramp or elevator can be provided for raising the carriage-nacelle assembly, or carriage-rotor-nacelle assembly, to the height of the platform.

The method can include mounting the carriage-rotor-nacelle assembly on the vessel on a movable support. Preferably the carriage-rotor-nacelle assembly is mounted on the movable support such that the rotor hub faces downwards towards the hull of the vessel. The rotor blades protrude substantially horizontally outwards from the hub. The movable support supports the hub. The movable support can include a wheeled undercarriage. The wheeled undercarriage is mounted on rails attached to the vessel deck. The movable support can include a slidable uppercarriage support. The uppercarriage support is mounted on the wheeled undercarriage. The uppercarriage support is arranged to slide on rails attached to the undercarriage. The uppercarriage support includes a base and upwardly protruding arms that are arranged to receive and support the rotor hub.

The method can include supporting ends of rotor blades with straps. The straps are fixed to an upper most end of the nacelle and are tensioned. The straps prevent undue movement of the rotors during transport and increase the clearance between blade tips and the sea surface when mounted on the vessel.

The method can include initially mounting the carriage-nacelle assembly, or carriage-rotor-nacelle assembly, on to a first side of the tower at a first position. Preferably the first position is located towards a lower end of the tower.

The method can include mounting the carriage-rotor-nacelle assembly on to the tower at the first position in an orientation wherein the rotor hub faces generally downwards towards the ground or sea. The rotor blades protrude substantially horizontally outwards from the hub. Mounting the carriage-rotor-nacelle assembly to the tower in this orientation is advantageous when it is necessary to pivot the nacelle into position at the top of the tower since the carriage is able to support the nacelle closer to its centre of gravity, which makes the pivoting process easier.

The tower can include at least one support formation. The carriage-nacelle assembly, or carriage-rotor-nacelle assembly, can include at least one support formation. The method includes engaging the carriage-nacelle assembly, or carriage-rotor-nacelle assembly, support formation(s) with the tower support formation(s), thereby supporting the weight of the carriage-nacelle assembly, or carriage-rotor-nacelle assembly, on the first side of the tower. In preferred embodiments the tower includes a plurality of support formations and the carriage-nacelle assembly, or carriage-rotor-nacelle assembly, includes a plurality of support formations. Preferably the support formations are located towards a lower end of the tower. Preferably the support formations are located on the first side of the tower. It will be appreciated that the support formations can comprise many shapes and arrangements, for example lugs, locating pins, hooks, male and female recessed mating members. The purpose of the support formations is to provide an initial engagement between the carriage-nacelle assembly, or carriage-rotor-nacelle assembly, and the tower, and to support the weight of the carriage-nacelle assembly, or carriage-rotor-nacelle assembly, until the elevator carriage engages with rails formed on the tower.

The carriage-nacelle assembly, or carriage-rotor-nacelle assembly, can be mounted to the tower with approximately zero acceleration. The carriage-nacelle assembly, or carriage-rotor-nacelle assembly, is very heavy, typically in the region of 400 to 700 tons. The carriage-nacelle assembly, or carriage-rotor-nacelle assembly, is therefore mounted on to the tower at very low speed and at minimal acceleration.

The tower can include at least one elevator rail arranged along the length of the tower. The rails can be included in newly manufactured towers. The rails can be retro-fitted to existing wind turbine towers for example for maintenance purposes, or for replacing an existing rotor-nacelle assembly with a new rotor-nacelle assembly.

The elevator carriage can include means for releasably engaging the rail(s).

The means for releasably engaging the rail(s) can include at least one adjustable bearing arranged to selectively engage the rail(s). The adjustable bearing is movable into and out of engagement with the rail(s). For example, the adjustable bearing can include a bearing surface such as a roller bearing or a plain bearing. An actuator moves the bearing surface into and out of engagement with the rail(s). The bearing surface can be mounted to a support, such as a pivotable arm. The or each bearing is arranged to selectively engage its respective rail according to control signals received from a controller.

The means for releasably engaging the rail(s) can include at least one non-adjustable bearing for engaging the rail(s). In some embodiments the or each non-adjustable bearing includes roller elements. In some embodiments the or each non-adjustable bearing includes plain bearings.

The or each rail can have a substantially T-shaped transverse cross-section. That is, transverse to the length of the or each rail.

The elevator carriage can include a drive system for moving the elevator carriage along the elevator rail(s). The method includes activating the drive system to move the carriage-nacelle assembly, or carriage-rotor-nacelle assembly, up the tower from the first position to a second position. Preferably the second position is adjacent the top of the tower.

The drive system can include at least one drive source, such as an electric motor or hydraulic motor. The drive system can include a transmission, and preferably a step-down transmission.

The drive system can include at least one drive unit. Preferably the drive unit includes at least one drive gear. The at least one drive gear is arranged to releasably engage elevator system drive teeth, for example in the form of a rack and pinion arrangement. Preferably the or each drive unit includes a plurality of drive gears. The or each drive gear can be moved into and out of engagement with the elevator system drive teeth. For example, an actuator controlled by a controller can be arranged to move the or each drive gear into and out of engagement with the elevator drive teeth. In preferred embodiments the elevator rails include the drive teeth. In preferred embodiments, the or each elevator rail includes internal drive teeth and external drive teeth. Preferably the or each drive unit includes at least one drive gear arranged to releasably engage the internal drive teeth and at least one drive gear arranged to releasably engage the external drive teeth.

The drive system can include first and second drive units. The elevator system can include first and second sets of drive teeth. The first drive unit is arranged to releasably engage the first set of drive teeth. The second drive unit is arranged to releasably engage the second set of drive teeth. Advantageously the position of at least one, and preferably each, of the first and second drive units is adjustable while the carriage is moving along the rail(s). At least one of the first and second drive units is movable towards and away from the other of the first and second drive units. This accounts for towers having a plurality of sets of rails wherein the distance between the rails varies along the length of the tower. For example, some towers are narrower at the top than at the base.

The drive system can include locking means for locking the position of the carriage-nacelle assembly, or carriage-rotor-nacelle assembly, with respect to the tower. For example, the drive source can be arranged to lock the position of the carriage with respect to the rail(s). Additionally, or alternatively, the drive system can include a ratchet mechanism that is arranged to lock the position of the carriage with respect to the rail(s).

The nacelle can be pivotally attached to the elevator carriage. In preferred embodiments a pivot axis is located at or adjacent to the centre of gravity of the rotor-nacelle or nacelle. The rotor-nacelle or nacelle therefore rotates about its centre of gravity. For example, the carriage can include at least one connector arm and the nacelle can include at least one flange. The or each connector arm is pivotally attached to the at least one flange by a pivot pin.

The method can include providing actuator means, for example a linear driver such as a hydraulic ram, and using the actuator means to pivot the nacelle, or rotor-nacelle assembly, with respect to the elevator carriage. The actuator rotates the rotor-nacelle or nacelle about the pivot axis located at or adjacent to the centre of gravity. The linear driver is pivotally attached to the chassis, preferably towards one end of the chassis, for example the end of the chassis opposite to where the nacelle is pivotally attached to the chassis. This enables the nacelle, or nacelle-rotor, to change its orientation with respect to the carriage when the carriage-nacelle assembly, or carriage-rotor-nacelle assembly, reaches the top of the tower. The nacelle, or nacelle-rotor, is pivoted from the substantially vertical orientation used when elevating the carriage-nacelle assembly, or carriage-rotor-nacelle assembly, to a substantially horizontal orientation at the top of the tower. When the nacelle is in a horizontal orientation the rotor is arranged in a substantially vertical orientation. This is the normal operating orientation of the nacelle.

The method can include fixing the nacelle to the top of the tower. Typically a yaw bearing is connected to a tower flange by bolts. Typically the bolts are applied manually.

The elevator carriage can be releasably attached to the nacelle. The method includes disengaging the elevator carriage from the nacelle, for example by removing the pivot pin connecting the arms to the flanges. This enables the elevator carriage to be separated from the nacelle, and to return to the lower end of the tower for reuse.

The method can include automatically releasing the carriage from the nacelle. An actuator can be provided for disengaging the pivot connection between the carriage and nacelle.

The method can include attaching a rotor, or the component parts thereof, to the nacelle while the carriage-nacelle assembly is mounted on the tower. For example, when the carriage-nacelle assembly is located towards a lower part of the tower. This is a preferred method for onshore installations. Typically the rotor comprises a hub and rotor blades.

The hub and blades can be attached separately to the carriage-nacelle assembly while mounted on the tower, or as a completed rotor.

According to another aspect of the invention there is provided a wind turbine system, including: a tower, a nacelle and an elevator carriage, wherein the elevator carriage is pre-attached to the nacelle to form a carriage-nacelle assembly that is mountable on to the tower.

The system can include a rotor, wherein the rotor is pre-attached to the nacelle to form a carriage-rotor-nacelle assembly that is mountable to the tower.

The tower can include at least one support formation. The carriage-nacelle assembly, or carriage-rotor-nacelle assembly, includes at least one support formation arranged to engage the at least one tower support formation to support the weight of the carriage-nacelle assembly, or carriage-rotor-nacelle assembly, on the first side of the tower. In preferred embodiments the tower includes a plurality of support formations and the carriage-nacelle assembly, or carriage-rotor-nacelle assembly, includes a plurality of support formations. Preferably the support formations are located towards a lower end of the tower. Preferably the support formations are located on the first side of the tower. It will be appreciated that the support formations can comprise many shapes and arrangements, for example lugs, locating pins, hooks, male and female (e.g. a recess) mating members. The purpose of the support formations is to provide an initial engagement between the carriage-nacelle assembly, or carriage-rotor-nacelle assembly, and the tower, and to support the weight of the carriage-nacelle assembly, or carriage-rotor-nacelle assembly, until the elevator carriage engages with rails formed on the tower.

The tower can include at least one elevator rail arranged along the length of the tower.

The elevator carriage can include attachment means for releasably engaging the rail(s).

The means for releasably engaging the rail(s) can include at least one adjustable bearing arranged to selectively engage the rail(s). The adjustable bearing is movable into and out of engagement with the rail(s). For example, the adjustable bearing can include a bearing surface such as a roller bearing or a plain bearing. An actuator moves the bearing surface into and out of engagement with the rail(s). The bearing surface can be mounted to a support, such as a pivotable arm. The or each bearing is arranged to selectively engage its respective rail according to control signals received from a controller.

The means for releasably engaging the rail(s) can include at least one non-adjustable bearing for engaging the rail(s). In some embodiments the or each non-adjustable bearing includes roller elements. In some embodiments the or each non-adjustable bearing includes plain bearings.

The or each rail can have a substantially T-shaped transverse cross-section. That is, transverse to the length of the rail.

The elevator carriage can include a drive system for moving the elevator carriage along the elevator rail(s).

The drive system can include at least one drive source, such as an electric motor or hydraulic motor. The drive system can include a transmission, and preferably a step-down transmission.

The drive system can include at least one drive unit. Preferably the drive unit includes at least one drive gear. The at least one drive gear is arranged to releasably engage elevator system drive teeth, for example in the form of a rack and pinion arrangement. Preferably the or each drive unit includes a plurality of drive gears. The or each drive gear can be moved into and out of engagement with the elevator system drive teeth. For example, an actuator controlled by a controller can be arranged to move the or each drive gear into and out of engagement with the elevator drive teeth. In preferred embodiments the elevator rail(s) includes the drive teeth. In preferred embodiments, the or each elevator rail includes internal drive teeth and external drive teeth. Preferably the or each drive unit includes at least one drive gear arranged to releasably engage the internal drive teeth and at least one drive gear arranged to releasably engage the external drive teeth.

The drive system can include first and second drive units. The elevator system can include first and second sets of drive teeth. The first drive unit is arranged to releasably engage the first set of drive teeth. The second drive unit is arranged to releasably engage the second set of drive teeth. Advantageously the position of at least one, and preferably each, of the first and second drive units is adjustable while the carriage is moving along the rail(s). At least one of the first and second drive units is movable towards and away from the other of the first and second drive units. This accounts for towers having a plurality of sets of rails wherein the distance between the rails varies along the length of the tower. For example, some towers are narrower at the top than at the base.

The drive system can include locking means for locking the position of the carriage-nacelle assembly, or carriage-rotor-nacelle assembly, with respect to the tower. For example, the drive source can be arranged to lock the position of the carriage with respect to the rail(s). Additionally, or alternatively, the drive system can include a ratchet mechanism that is arranged to lock the position of the carriage with respect to the rail(s).

The nacelle can be pivotally attached to the elevator carriage. In preferred embodiments a pivot axis is located at or adjacent to the centre of gravity of the rotor-nacelle or nacelle. The rotor-nacelle or nacelle therefore rotates about its centre of gravity. For example, the carriage can include at least one connector arm and the nacelle can include at least one flange. The or each connector arm is pivotally attached to the at least one flange by a pivot pin.

The carriage can include actuator means, for example a linear driver such as a hydraulic ram, arranged to pivot the nacelle, or nacelle-rotor, with respect to the elevator carriage. This enables the nacelle, or nacelle-rotor, to change its orientation with respect to the carriage when the carriage-nacelle assembly, or carriage-rotor-nacelle assembly, reaches the top of the tower. The nacelle, or nacelle-rotor, is pivoted from the substantially vertical orientation used when elevating the carriage-nacelle assembly, or carriage-rotor-nacelle assembly, to a substantially horizontal orientation at the top of the tower. When the nacelle is in a horizontal orientation the rotor is arranged in a substantially vertical orientation. This is the normal operating orientation of the nacelle.

The elevator carriage can be releasably attached to the nacelle. For example, the pivot pin can be removed, thereby separating the connector arms from the nacelle flanges. This enables the elevator carriage to be separated from the nacelle, and to return to the lower end of the tower for reuse.

The system can include actuator means for automatically releasing the carriage from the nacelle. An actuator can be provided for disengaging a pivot connection between the carriage and nacelle.

The system can include an umbilical cable for connecting the carriage to at least one of a power source; and a control system.

The system can include a vessel, such as a ship, for transporting the carriage-nacelle assembly, or carriage-rotor-nacelle assembly to the tower. The vessel includes a platform system for transferring the carriage-nacelle assembly, or carriage-rotor-nacelle assembly, from the vessel to the tower. The platform system includes a movable platform, a control system, at least one actuator and at least one sensor. The control system is arranged to automatically control operation of the at least one actuator to adjust the orientation of the movable platform in response to signals received from the at least one sensor to account for movement of the vessel. For example, caused by wind and waves. Thus the platform system automatically adjusts the orientation of the movable platform while transferring the carriage-nacelle assembly, or carriage-rotor-nacelle assembly, from the vessel to the tower. The movable platform control system controls positioning of the platform such that the platform is held substantially motionless relative to the tower irrespective of the motion of the vessel to which it is attached. This accounts for motion of the vessel during a transfer.

The system can include at least one movable support located on the vessel. The movable support is arranged to move the carriage-nacelle assembly, or carriage-rotor-nacelle assembly, from a storage position on to the movable platform. The movable support is arranged to receive the carriage-rotor nacelle assembly such that the rotor hub faces downwards towards the hull of the vessel. The rotor blades protrude substantially horizontally outwards from the hub. The movable support is arranged to engage the hub. The movable support is mounted on rails. In preferred embodiments the movable support is movable along the vessel in a longitudinal direction. The movable support can include a wheeled undercarriage. The wheeled undercarriage is mounted on rails attached to the vessel deck. The movable support can include a slidable uppercarriage support. The uppercarriage supports the hub. The uppercarriage support is mounted on the wheeled undercarriage. The uppercarriage support is arranged to slide on rails attached to the undercarriage. The uppercarriage support includes a base and upwardly protruding arms that are arranged to receive and support the rotor hub. The movable platform can be mounted towards one end of the vessel, and preferably towards the stern of the vessel. In some embodiments the movable platform can be mounted towards a longitudinal side of the vessel, for example towards the port or starboard side of the vessel. The movable platform can be arranged as a gang plank such that it overhangs an edge of the vessel. A ramp or elevator can be provided for raising the carriage-nacelle assembly, or carriage-rotor-nacelle assembly, to the height of the platform.

The movable support can be arranged to support the carriage-rotor-nacelle assembly on the vessel in an orientation such that the rotor hub faces downwards towards the bottom of the vessel. The rotor blades protrude substantially horizontally outwards from the hub. The movable support supports the hub.

The movable platform can be arranged to mount the carriage-nacelle assembly, or carriage-rotor-nacelle assembly, on to a first side of the tower at a first position. Preferably the first position is located towards a lower end of the tower.

The movable platform can be arranged to mount the carriage-rotor-nacelle assembly on to the tower at the first position in an orientation wherein the rotor hub faces generally downwards towards the ground or sea. The rotor blades protrude substantially horizontally outwards from the hub. Mounting the carriage-rotor-nacelle assembly to the tower in this orientation is advantageous when it is necessary to pivot the nacelle into position at the top of the tower since the carriage is able to support the nacelle closer to its centre of gravity, which makes the pivoting process easier.

According to another aspect of the invention there is provided a method for assembling a wind turbine, including: attaching a rotor to a nacelle; attaching an elevator carriage to the nacelle to form a carriage-turbine-rotor assembly; and mounting the carriage-turbine-rotor assembly on to the tower.

According to another aspect of the invention there is provided a vessel, such as a ship, including a platform system for transferring a load, such as a carriage-nacelle assembly, or a carriage-rotor-nacelle assembly, from the vessel to a receiving structure, such as an offshore wind turbine tower. The platform system includes a movable platform, a control system, at least one actuator and at least one sensor, wherein the control system is arranged to control operation of the at least one actuator to adjust the orientation of the movable platform in response to signals received from the at least one sensor. This accounts for movement of the vessel caused by, for example wind and waves while transferring the load to the receiving structure.

The movable platform can be mounted towards one end of the vessel, and preferably towards the bow of the vessel. The movable platform can be arranged as a gang plank such that it overhangs an edge of the vessel. Preferably the control system is arranged to maintain the movable platform in a substantially horizontal orientation. Preferably the movable platform control system controls positioning of the platform such that the platform is held substantially motionless relative to the tower irrespective of the motion of the vessel to which it is attached. This accounts for motion of the vessel during a transfer.

The actuators can comprise hydraulic rams. Preferably a plurality of hydraulic rams are provided. For example, 3 to 6 actuators are provided for controlling the orientation of the movable platform.

The vessel can include a ramp for raising the movable support, and hence carriage-nacelle assembly, or carriage-rotor-nacelle assembly, to the movable platform.

The vessel can include a lift for raising the movable support, and hence carriage-nacelle assembly, or carriage-rotor-nacelle assembly, to the movable platform.

The movable platform can be moved to a position to receive the load from a movable support.

The movable support can include a wheeled undercarriage. The wheeled undercarriage is mounted on rails attached to the vessel deck.

The movable support can include a slidable support. The slidable supported is mounted on the wheeled undercarriage. The slidable support is arranged to slide on rails attached to the undercarriage. The slidable support includes a base and upwardly protruding arms that are arranged to receive and support the rotor hub.

The movable platform can include rails. The slidable support is arranged to slide from the undercarriage rails on to the movable platform rails.

According to another aspect of the invention there is provided an elevator carriage for use with a wind turbine tower including at least one elevator rail.

The elevator carriage can include attachment means for releasably engaging the rail(s).

The means for releasably engaging the rail(s) can include at least one adjustable bearing arranged to selectively engage the rail(s). The adjustable bearing is movable into and out of engagement with the rail(s). For example, the adjustable bearing can include a bearing surface such as a roller bearing or a plain bearing. An actuator moves the bearing surface into and out of engagement with the rail(s). The bearing surface can be mounted to a support, such as a pivotable arm. The or each bearing is arranged to selectively engage its respective rail according to control signals received from a controller.

The means for releasably engaging the rails can include at least one non-adjustable bearing for engaging the rail(s). In some embodiments the or each non-adjustable bearing includes roller elements. In some embodiments the or each non-adjustable bearing includes plain bearings.

The or each rail can have a substantially T-shaped transverse cross-section. That is, transverse to the length of the rail.

The carriage can include a drive system for moving the elevator carriage along the elevator rail(s).

The drive system can include at least one drive source, such as an electric motor or hydraulic motor. The drive system can include a transmission, and preferably a step-down transmission.

The drive system can include at least one drive unit. Preferably the drive unit includes at least one drive gear. The at least one drive gear is arranged to releasably engage elevator system drive teeth, for example in the form of a rack and pinion arrangement. Preferably the or each drive unit includes a plurality of drive gears. The or each drive gear can be moved into and out of engagement with the elevator system drive teeth. For example, an actuator controlled by a controller can be arranged to move the or each drive gear into and out of engagement with the elevator drive teeth. In preferred embodiments the elevator rails include the drive teeth. In preferred embodiments, the or each elevator rail includes internal drive teeth and external drive teeth. Preferably the or each drive unit includes at least one drive gear arranged to releasably engage the internal drive teeth and at least one drive gear arranged to releasably engage the external drive teeth.

The drive system can include first and second drive units. The elevator system can include first and second sets of drive teeth. The first drive unit is arranged to releasably engage the first set of drive teeth. The second drive unit is arranged to releasably engage the second set of drive teeth. Advantageously the position of at least one, and preferably each, of the first and second drive units is adjustable while the carriage is moving along the rails. At least one of the first and second drive units is movable towards and away from the other of the first and second drive units. This accounts for towers having a plurality of sets of rails wherein the distance between the rails varies along the length of the tower. For example, some towers are narrower at the top than at the base.

The drive system can include locking means for locking the position of the carriage-nacelle assembly, or carriage-rotor-nacelle assembly, with respect to the tower. For example, the drive source can be arranged to lock the position of the carriage with respect to the rail(s). Additionally, or alternatively, the drive system can include a ratchet mechanism that is arranged to lock the position of the carriage with respect to the rail(s).

The elevator carriage is arranged to be pivotally attached to a nacelle. In preferred embodiments a pivot axis is located at or adjacent to the centre of gravity of the rotor-nacelle or nacelle. The rotor-nacelle or nacelle therefore rotates about its centre of gravity. For example, the carriage can include at least one connector arm and the nacelle can include at least one flange. The or each connector arm is pivotally attached to the at least one flange by a pivot pin.

The carriage can include actuator means, such as a hydraulic ram or linear drive, arranged to pivot the nacelle, or nacelle-rotor, with respect to the elevator carriage. This enables the nacelle, or nacelle-rotor, to change its orientation with respect to the carriage when the carriage-nacelle assembly, or carriage-rotor-nacelle assembly, reaches the top of the tower.

The nacelle, or nacelle-rotor, is pivoted from the substantially vertical orientation used when elevating the carriage-nacelle assembly, or carriage-rotor-nacelle assembly, to a substantially horizontal orientation at the top of the tower. When the nacelle is in a horizontal orientation the rotor is arranged in a substantially vertical orientation. This is the normal operating orientation of the nacelle.

The elevator carriage can be releasably attached to the nacelle. For example, the pivot pin can be removed, thereby separating the connector arms from the nacelle flanges. This enables the elevator carriage to be separated from the nacelle, and to return to the lower end of the tower for reuse.

The carriage can include actuator means for automatically releasing the carriage from the nacelle. An actuator can be provided for disengaging a pivot connection between the carriage and nacelle.

The carriage can include an umbilical cable for connecting the carriage to at least one of a power source; and a control system.

In some embodiments the carriage includes a platform attached thereto for supporting maintenance workers and/or maintenance equipment.

According to another aspect of the invention there is provided a method for servicing a wind turbine, including: providing a wind turbine tower having at least one elevator rail attached thereto; attaching an elevator carriage to the at least one elevator rail, said elevator carriage including a platform attached thereto for maintenance workers and/or maintenance equipment, and moving the elevator carriage along the at least one rail to servicing position. Maintenance work is undertaken at the servicing position. This may involve removing existing wind turbine equipment, installing new equipment and/or repairing existing equipment.

According to another aspect of the invention there is provided a wind turbine system including a tower and an elevator system, the elevator system including at least one rail attached to the tower and a carriage movably mounted to the at least one rail, wherein the carriage includes a platform attached thereto for supporting maintenance workers and/or maintenance equipment. The at least one elevator rail can be retro-fitted to a pre-existing wind turbine tower or can be included in new towers.

In preferred embodiments the elevator rail extends from a lower part of the tower toward an upper part of the tower.

In some embodiments the platform includes an aperture or recess for receiving a rotor blade. Accordingly the platform loops around the blade. This enables all sides of the blade to be inspected.

In some embodiments the carriage-platform assembly includes a crane. Preferably the crane comprises a hydraulic single arm crane.

The elevator system is mounted on an outer side of the tower.

The carriage includes a chassis and the platform is arranged substantially perpendicularly thereto. The platform is arranged substantially horizontally when the carriage is attached to the at least on rail.

In preferred embodiments the platform includes a safety rail. For example, the safety rail can extend around the perimeter of the platform.

The carriage can include any other features of the carriages described herein, such as the attachment system and drive system.

According to another aspect of the invention there is provided a wind turbine system, including: a tower, a nacelle and an elevator system including an elevator carriage.

Embodiments of the present invention will now be described, by way of example only, with reference to the accompanying drawings in which.

Figure 1:
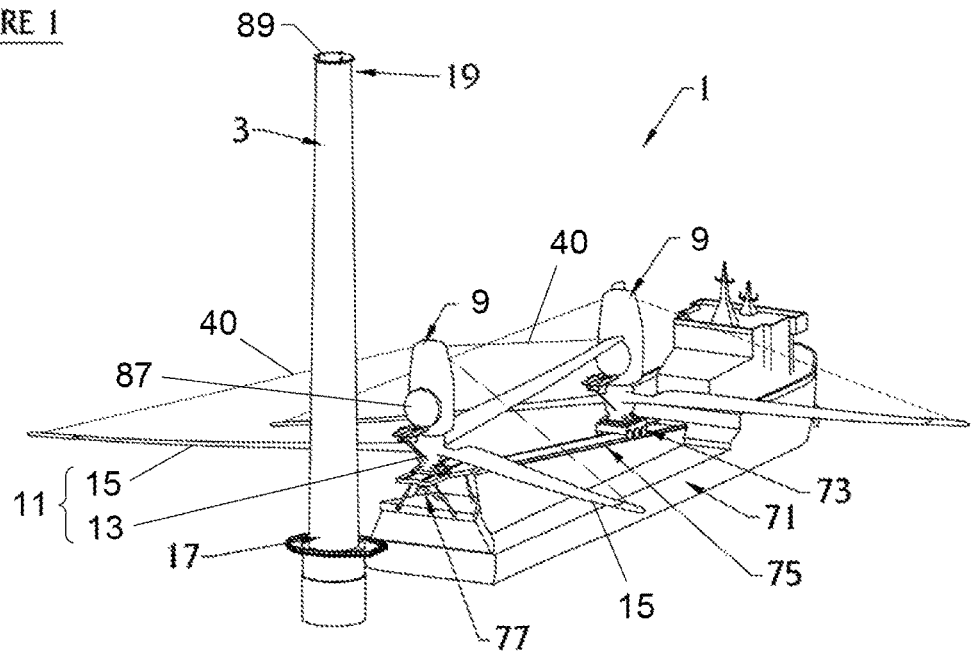
FIG. 1 shows a wind turbine system according to the invention.
Figure 2:
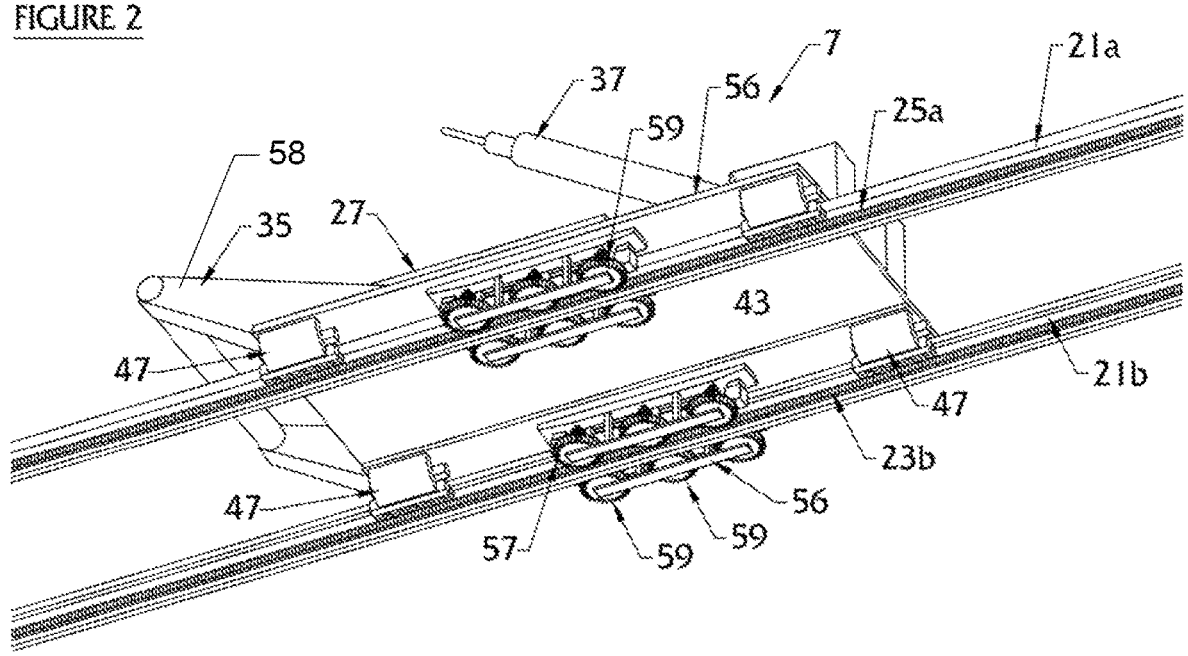
FIG. 2 is an isometric view of an underside of a carriage and rail system from the wind turbine system of FIG. 1.
Figure 3:
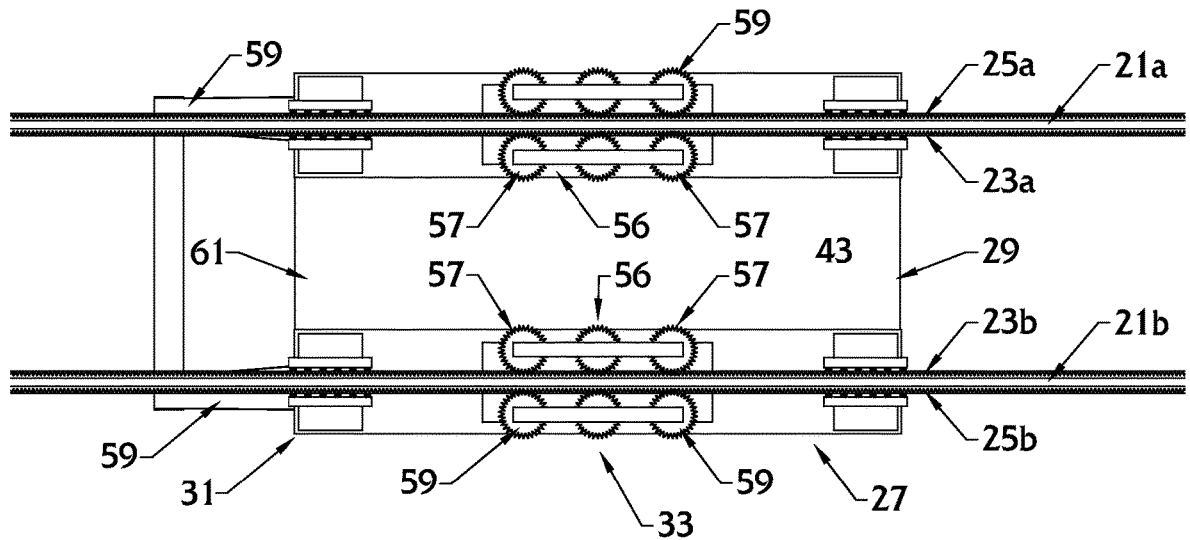
FIG. 3 is a plan view of the underside of the carriage and rail system of FIG. 2.

FIG. 1 shows a wind turbine system 1 according to the invention. The wind turbine system 1 includes a tower 3, a nacelle 9, a rotor 11 (the combined rotor 11 and nacelle 9 are hereinafter referred to as the rotor-nacelle assembly 11,9) and an elevator system 7 for elevating the rotor-nacelle assembly 11,9 up the tower 3. The rotor 11 comprises a hub 13 and a plurality of blades 15, typically two or three blades 15.

The tower 3 is an offshore tower. Preferably the tower 3 has a single tubular structure. However other arrangements are possible. For example, the tower 3 can have a plurality of tubular structures, typically three, connected by steel latticework. The tower 3 has a base 17 and a top 19. The tower 3 includes a plurality of support formations 20 mounted on to an outer surface of the tower. The support formations 20 are in the form of hooks, though other formations can be used.

Figure 4A:
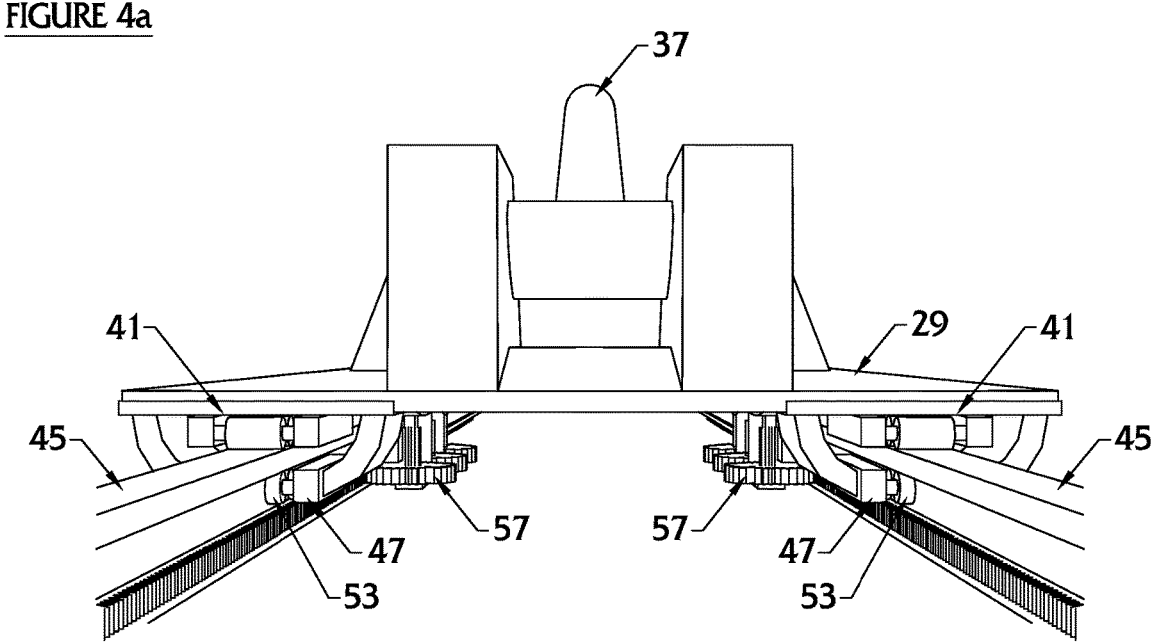
FIG. 4a is an isometric view from one end of the carriage and rail system of FIG. 2.
Figure 4B:
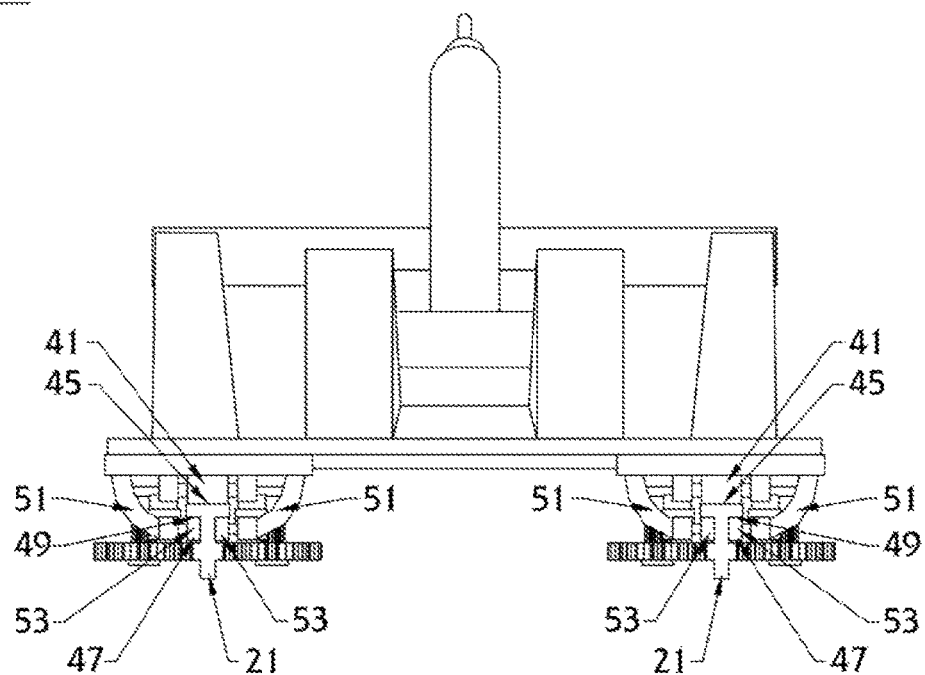
FIG. 4b is an end view from one end of the carriage and rail system of FIG. 2.
Figure 5:
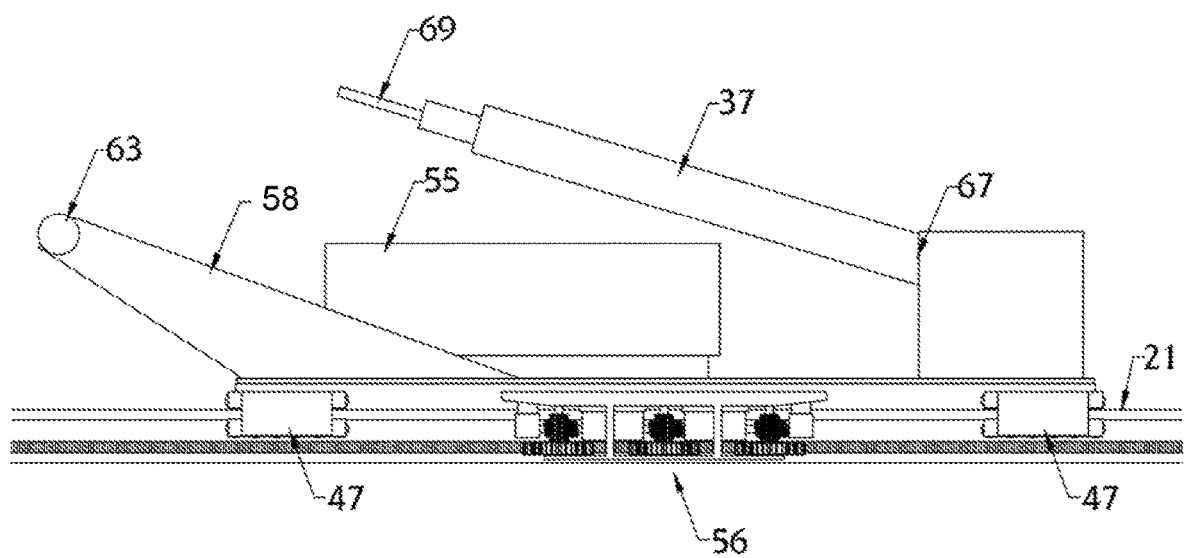
FIG. 5 is a side view of the carriage and rail system of FIG. 2.
Figure 6:
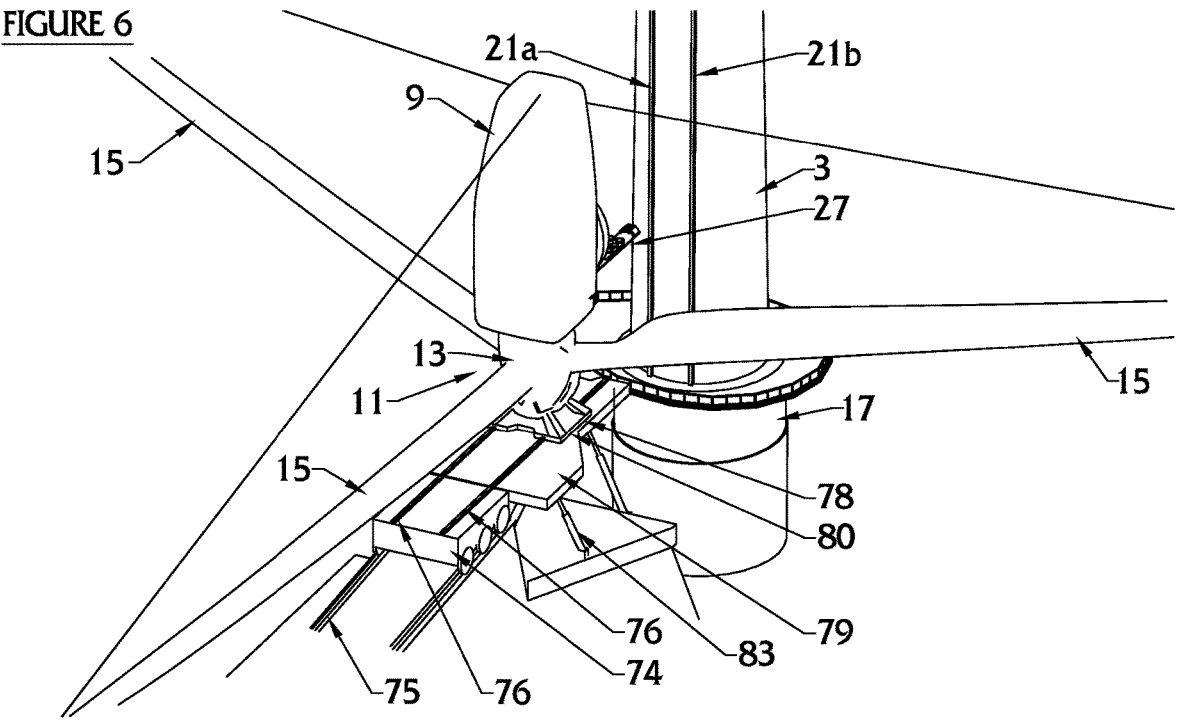
FIGS. 6 to 13 show steps in a wind turbine assembly method according to the invention.
Figure 7A:
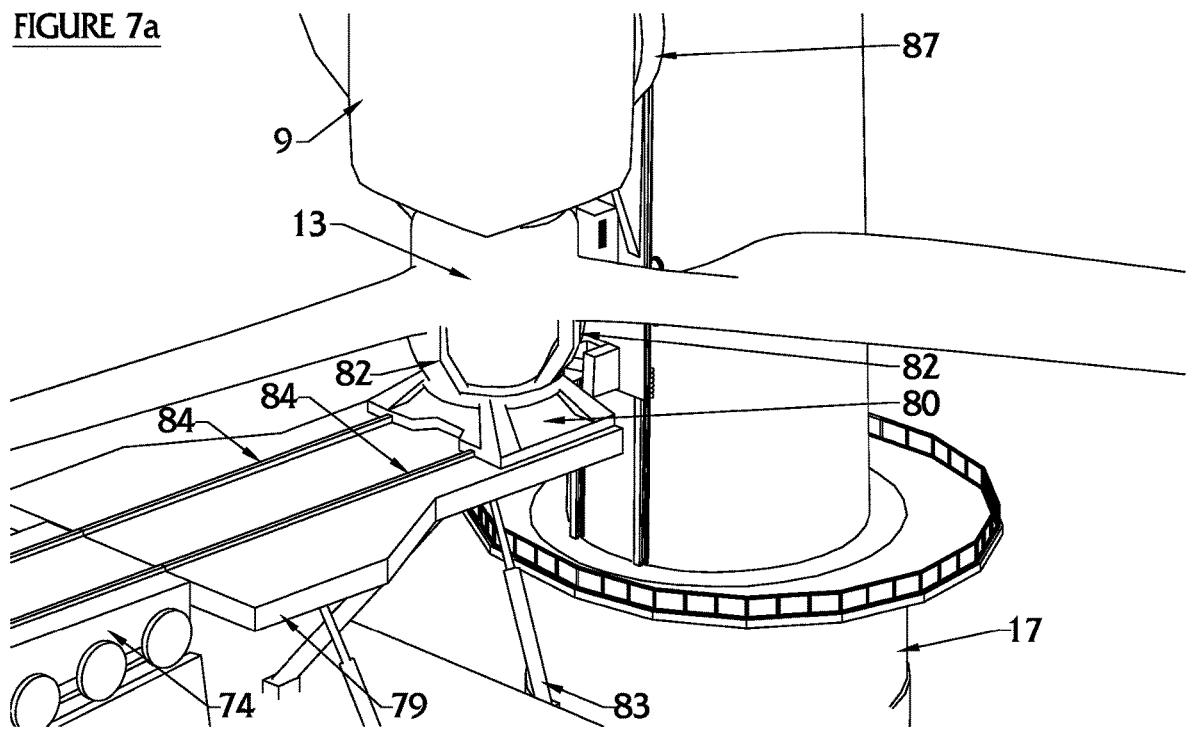
Figure 7B:
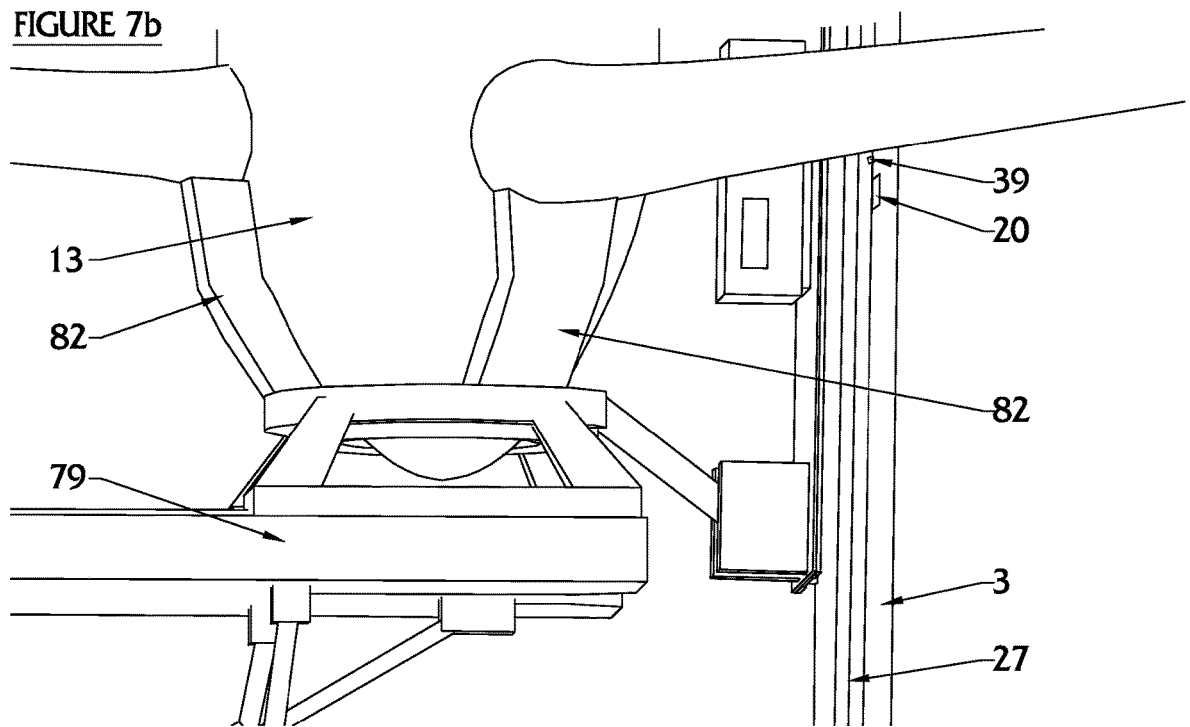
Figure 8:
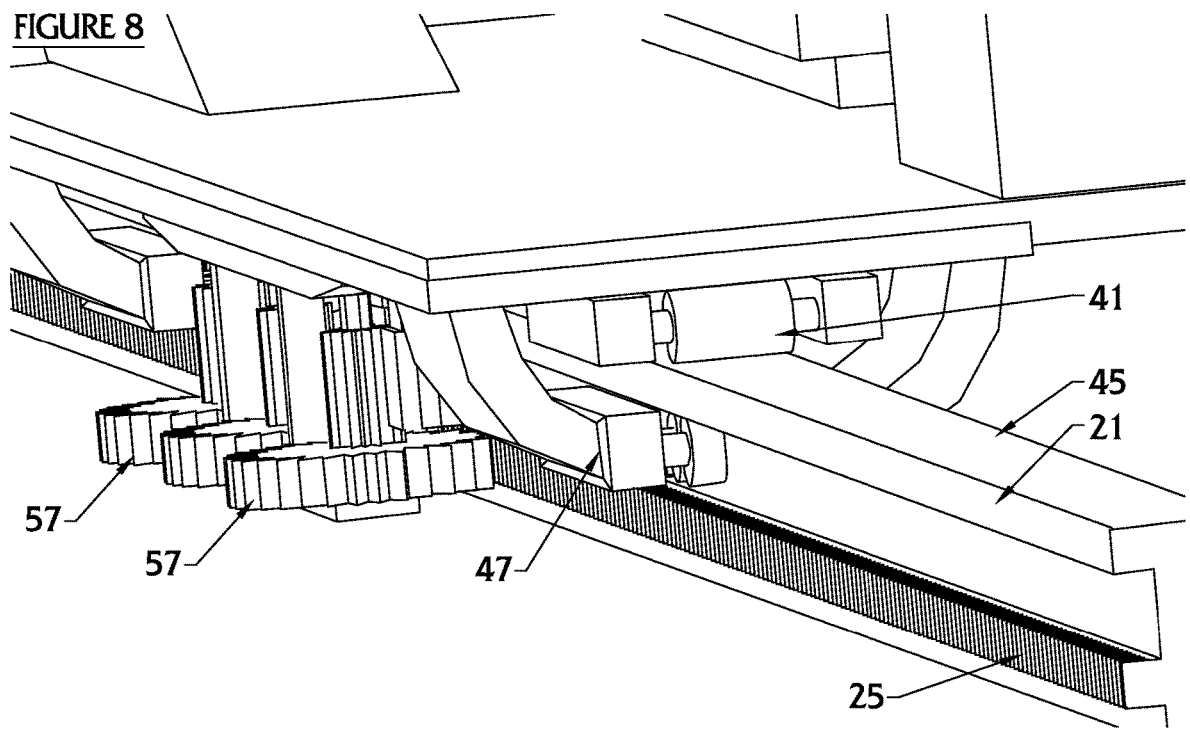
Figure 9:
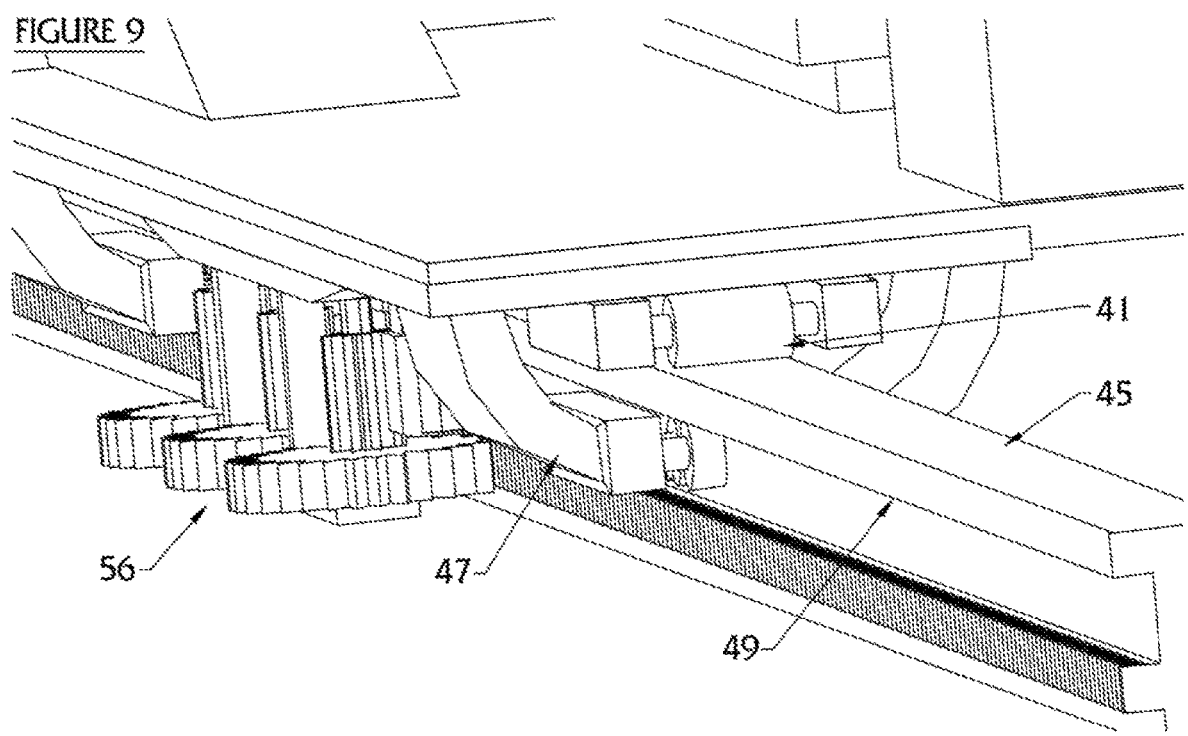
Figure 10:
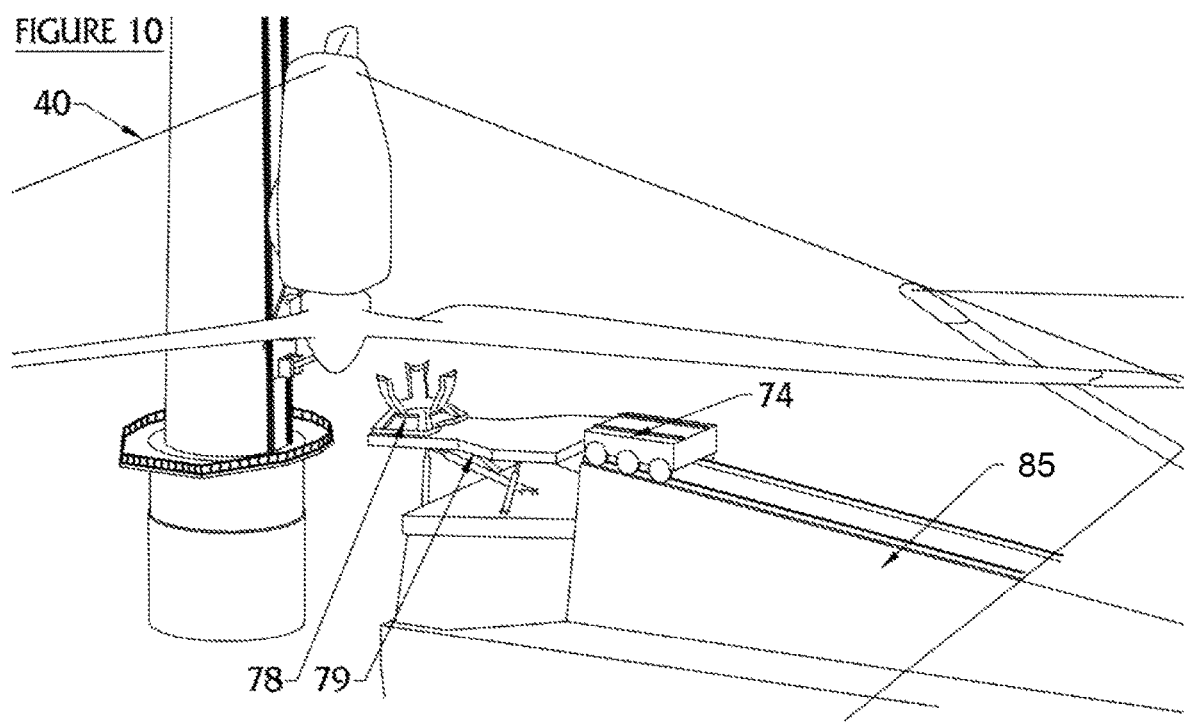
Figure 11:
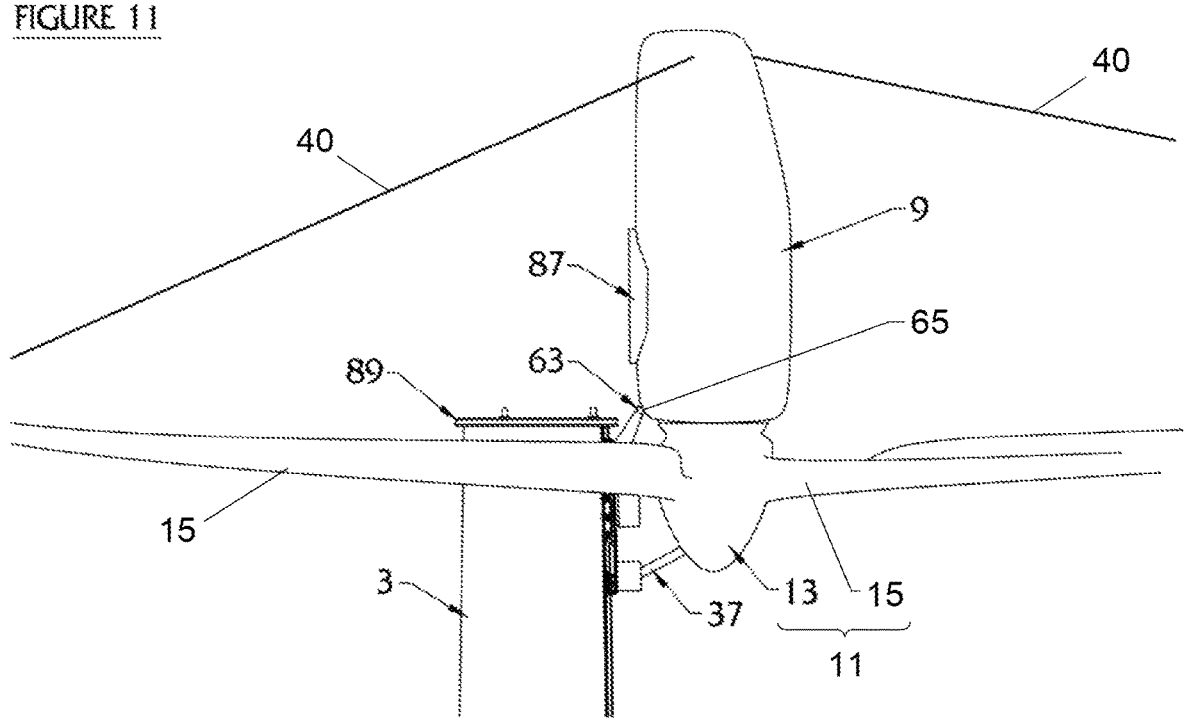
Figure 12:
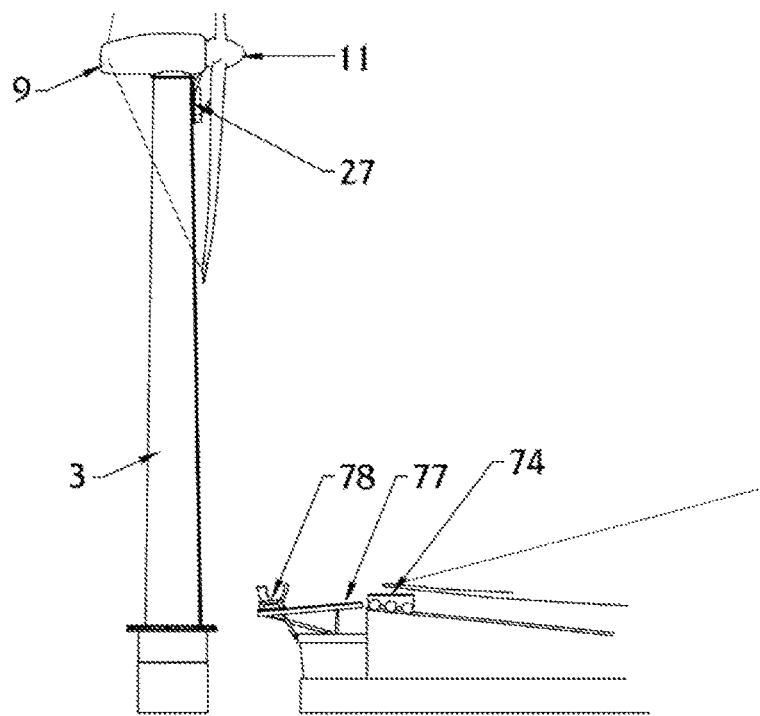
Figure 13:
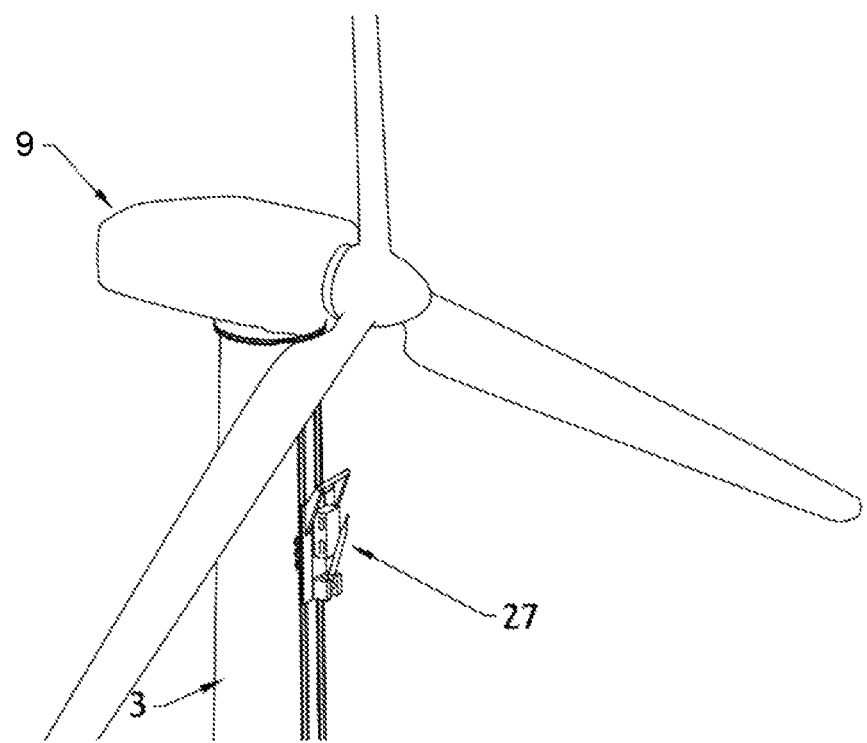

The elevator system 7 includes a pair of rails 21 mounted to an outer surface of the tower 3. The rails 21a,21b extend along at least a substantial part of the length of the tower, typically from a position adjacent the base 17 to a position adjacent the top 19 of the tower. Each rail 21a,21b has a substantially T-shaped cross-section, which is best seen in FIGS. 4a and 4b. Each rail 21 includes internal and external teeth 23a,23b,25a,25b running along the length of the rail.

The elevator system 7 includes a carriage 27. The carriage 27 comprises a chassis 29, a rail attachment system 31 for attaching the carriage to the rails 21a,21b and a drive system 33 for moving the carriage 27 along the rails 21a,21b. The carriage 27 also includes a connector assembly 35 for pivotally attaching the carriage 27 to the nacelle 9 and a driver 37 for pivoting the nacelle 9 with respect to the chassis 29.

The rail attachment system 31 includes four sets of rollers bearings 41 for engaging the rails 21. Two sets of the roller bearings 41 engage a first rail 21a and two sets of the roller bearings 41 engage a second rail 21b. The roller bearings 41 are located on an underside 43 of the chassis, that is, a side that faces towards the tower 3 when the carriage 27 is attached to the tower. The roller bearings 41 engage an outermost surface 45 of the rails. The rail attachment system 31 includes four sets of adjustable roller bearings 47 for selectively engaging the rails 21. Two sets of the adjustable roller bearings 47 selectively engage the first rail 21a and two sets of the adjustable roller bearings 47 selectively engage the second rail 21b. The adjustable roller bearings 47 are located on the underside 43 of the chassis. Each adjustable roller bearing 47 comprises a pair of curved arms 51. Each arm 51 is pivotally attached to the chassis 29 towards one end. Sets of rollers 53 are located towards a free end of each arm 51. Actuators adjust the position of the arms 51 in response to control signals received from a controller. The controller is arranged to selectively move the sets of rollers 53 into and out of engagement with their respective rails 21a,21b. The rollers 53 are arranged to engage rail surfaces 49 that face towards the tower. When the carriage 27 is mounted on to the tower, the bearings 47 are in an open, disengaged, position. The controller actuates the actuators to move the rollers 53 in to engagement with their respective rails 21a,21b. This firmly attaches the carriage 27 to the rails 21a,21b, and the carriage 27 is ready to move along the rails.

The drive system 33 includes at least one drive source 55, such as an electric motor, and an arrangement of gears for engaging the internal and external teeth 23a,25a on the rails. A first drive unit 56 including a set of six gears is arranged to engage the teeth on the first rail 21a: an inner set of three gears 57 engage the internal teeth 23a and an outer set of three gears 59 engage the outer teeth 25a. A second drive unit 56 including a set of six gears is arranged to engage the teeth on the second rail 21b: an inner set of three gears 57 engage the internal teeth 23b and an outer set of three gears 59 engage the outer teeth 25b. The drive source 55 is arranged to rotate the gears 57 either directly or via a transmission. As the gears 57,59 rotate the carriage 27 moves along the rails 21a,21b. The drive system 33 includes a ratchet arrangement to prevent the carriage 27 from falling down the tower 3, for example in the event of a power failure. The ratchet is releasable to enable the carriage 27 to move down the tower. In preferred arrangements, the drive system 33 is arranged to selectively engage the rails 21a, 21b. For example, the drive system 33 can include a controller and actuators for controlling operation of the first and second drive units 56. The actuators are arranged to move the gears 57,59 into and out of engagement with their respective teeth 23a,25a,23b,25b, in response to control signals from the controller. Thus the gears 57,59 can be in a disengaged position as the carriage 27 is mounted onto the tower 3 and can be moved into an engaged position to drive the carriage along the rails 21a,21b.

The carriage 27 includes carriage support formations 39. The carriage support formations 39 are arranged to engage with the support formations 20 on the tower 3, when the carriage-turbine assembly is initially attached to the tower 3. The tower support formations 20 are arranged to support the weight of the carriage-rotor-nacelle assembly 27,9,11 until the rail attachment system 31 engages the rails and the drive system 33 is engaged.

The connector assembly 35 includes arms 58 that protrude upwards from the chassis 29. The arms 58 are inclined to the plane of the chassis. The arms 59 protrude beyond a leading edge 61 of the chassis. A pivot pin 63 connects arms 58 with receiving formations 65 on the nacelle casing, or on a separate adaptor plate (not shown), which can be secured between a yaw bearing and a tower top flange. Thus the rotor-nacelle assembly 11,9 is pivotally attached to the carriage chassis 29. Preferably the receiving formations 65 are located at approximately the centre of gravity of the rotor-nacelle assembly 11,9. This reduces the force required in order to pivot the rotor-nacelle assembly 11,9 with respect to the chassis 27. The driver 37 preferably comprises a linear driver, for example a hydraulic ram. The length of the linear driver 37 is adjustable, and is typically telescopically adjustable. A controller is provided to controllably adjust the length of the linear driver, for example a hydraulic controller. The driver 37 is pivotally attached to the chassis 27 towards a first end 67 of the linear driver. The second end 69 of the linear driver is arranged to engage with the nacelle 9 or hub 13 in order to pivot the rotor-nacelle assembly 11,9 with respect to the chassis 27. This is achieved by adjusting the length of the linear driver 37 at the appropriate time.

The carriage 27 is attached to the rotor-nacelle assembly 11,9 prior to mounting the assembly 11,9 on to a side of the tower 3. This enables a fast assembly time, which is particularly important for offshore wind farms where changeable weather can provide limited windows of opportunity for assembling the wind turbines. In particular, the carriage 27 is releasably attached to the nacelle 9 by means of the pivot pin 63. By removing the pivot pin 63, either manually or by means of an actuator, the carriage 27 is separable from the rotor-nacelle assembly 11,9 when the nacelle 9 is located at the top 19 of the tower. This enables the carriage 27 to return to the bottom of the tower for reuse.

The carriage 27 also includes alignment sensors to assist with mounting the carriage-rotor-nacelle assembly 27,11,9 on to the tower 3.

For offshore wind farms, the carriage-rotor-nacelle assembly 27,11,9 is transported to the tower 3 by ship 71. The ship 71 is essentially a conventional ship that has been modified to transport at least one, and typically two or three, carriage-rotor-nacelle assemblies 27,11,9. That is, according to the invention, the ship does not have to be a crane vessel type ship that is capable of raising its hull out of the water or a semi-submersible crane vessel.

Each carriage-rotor-nacelle assembly 27,11,9 is mounted on an individual movable support 73 on the deck of the ship. The carriage-rotor-nacelle assembly 27,11,9 is supported by the movable support 73 in a manner such that the rotor hub 13 faces generally downwards towards the ship deck and the rotors 11 are arranged substantially horizontally. The movable support 73 supports the hub 13. The nacelle 9 protrudes upwardly from the hub 13. The movable support 73 is mounted on rails 75. The movable support 73, and hence the carriage-rotor-nacelle assembly 27,11,9 mounted thereon, is movable along the rails 75. The rails 75 guide the movable support 73 and the carriage-rotor-nacelle assembly 27,11,9 to a transfer site.

The movable support 73 includes a wheeled undercarriage 74. The wheeled undercarriage includes rails 76 on an upper surface. The movable support 73 includes a slidable uppercarriage 78. The slidable uppercarriage 78 is mounted on the undercarriage 74 and is arranged to slide along the rails 76. The uppercarriage 78 includes a base 80 and support arms 82 that are arranged to engage and support the rotor hub 13.

The ship 71 includes a platform system 77 for transferring the carriage-rotor-nacelle assembly 27,11,9 from the ship 71 to the tower 3. The platform system 77 includes a movable platform 79, a control system, actuators 83 such as hydraulic rams, and sensors. The control system is arranged to automatically control operation of the actuators 83 to adjust the orientation of the movable platform 79 in response to signals received from the sensors to account for movement of the ship caused by wind and waves while transferring the carriage-rotor-nacelle assembly 27,11,9 from the ship 71 to the tower 3. The control system adjusts the orientation of the movable platform 79 seeking to maintain the platform 79 in a substantially horizontal orientation, irrespective of the orientation of the ship's deck. The movable platform control system controls positioning of the platform such that the platform is held substantially motionless relative to the tower irrespective of the motion of the vessel to which it is attached. This accounts for motion of the vessel during a transfer. Typically the system includes 3 to 6 actuators 83.

The movable platform 79 can be located towards one end of the ship 71, and preferably towards the stern of the ship. The movable platform 79 is arranged as a gang plank such that it overhangs an edge of the ship.

Preferably the movable platform 79 includes rails 84, and the uppercarriage 78 is arranged to slide on to the platform along rails 84. Thus the movable support 73, and hence the carriage-rotor-nacelle assembly 27,11,9 is movable from a storage position on to the movable platform 79. From here, the carriage-rotor-nacelle assembly 27,11,9 can be transferred to the tower 3. Preferably the ship includes a ramp 85 for raising the carriage-rotor-nacelle assembly 27,11,9 to the height of the movable platform 79. The rails 75 extend up the ramp 85.

A method of assembling an offshore wind turbine will now be described with reference to FIGS. 1 and 6 to 13.

A tower 3 is erected at an offshore windfarm site. The tower 3 includes elevator rails 21a,21b.

A carriage-rotor-nacelle assembly 27,11,9 is assembled by attaching the rotor 11 to the nacelle 9, and pivotally connecting the carriage 27 to the nacelle 9. This typically takes place at a dockside. Supporting straps 40 can be used to connect the tips of the rotor blades 15 to the nacelle 9 for additional support. The rotor blades 15 are very flexible and gravity loading tends to bend them downwards during transit, and they will vibrate with large amplitudes if not constrained. The straps 40 prevent the rotor blades 15 from flexing during transit and increase the clearance between the rotor blade tips and the water. The straps 40 are removably attached to the rotor blades 15. The carriage 27 is typically locked in a horizontal orientation for transportation (see FIGS. 1 and 6). Each carriage-rotor-nacelle assembly 27,11,9 is loaded on to the ship 71. Each carriage-rotor-nacelle assembly 27,11,9 is mounted on to a movable support 73, such that the rotor hub 13 faces generally downwards towards the ship's deck and the rotors 11 are arranged substantially horizontally (see FIG. 1).

The ship 71 travels to the tower 3. The ship 71 is manoeuvred into position such that the movable platform 79 is adjacent the base 17 of the tower. The carriage-rotor-nacelle assembly 27,11,9 is transported on to the movable platform 79.

An umbilical cable is connected to the carriage 27. The umbilical cable provides power to the carriage 27. The umbilical cable facilitates transmission of control signals and status information between the carriage 27 and a control system located on the ship 71. A remote-control console is connected to the umbilical cable. The remote-control console is arranged to send control signals to the carriage 27. The remote-control console enables control signals to be sent to the carriage 27 by manual intervention, for example to control the attachment system 31, the drive system 33 to adjust the position of the carriage 27 on the rails 21a,21b, control the linear driver 37 to adjust the orientation of the rotor-nacelle assembly 11,9 and/or to operate an actuator to disconnect the pivot pin 63.

The orientation of the carriage 27 is changed from a substantially horizontal orientation to a substantially vertical orientation in readiness to engage the tower rails 21a,21b.

The carriage-rotor-nacelle assembly 27,11,9 is transferred across to the tower 3 by adjusting the position and of the movable platform 79. The carriage support formations 39 are brought into engagement with the tower support formations 20. The transfer is conducted at minimal speed and substantially zero acceleration to avoid damage to the tower and carriage-rotor-nacelle assembly 27,11,9. During the transfer of the carriage-rotor-nacelle assembly 27,11,9 to the tower 3 the umbilical cable is attached at the control system on the ship and control signals and status information from sensors on the carriage 27 are used by the platform control system 81 to correctly align the carriage 27 to the tower rails 21a,21b. At this stage, the carriage-rotor-nacelle assembly 27,11,9 is attached to a lower side of the tower. The weight of the carriage-rotor-nacelle assembly 27,11,9 is supported by the tower support formations 20.

Carriage actuators are then operated to engage the rails 21a,21b with the adjustable roller bearings 47, and the internal and external teeth 23a,23b,25a,25b with the gears 57,57,59,59. At this stage, the weight of the carriage-rotor-nacelle assembly 27,11,9 is supported by the tower support formations 20, the bearings 41,47 and the drive system 33, and the carriage-rotor-nacelle assembly 27,11,9 is ready to be elevated to the top 19 of the tower. When the carriage-rotor-nacelle assembly 27,11,9 is secured to the rails 21a, 21b the umbilical cable connection is transferred to the tower 3 and the ship 71 moves away from the tower.

The drive system 33 is activated and the carriage-rotor-nacelle assembly 27,11,9 is driven up the tower 3. When the assembly reaches the top 19 of the tower, the drive system 33 locks the position of the carriage-rotor-nacelle assembly 27,11,9 against further movement.

The linear driver 37 is actuated to rotate the rotor-nacelle assembly 11,9. The nacelle 9 is pivoted from a substantially vertical orientation to a substantially horizontal orientation. The rotor 11 is pivoted from a substantially horizontal orientation of the blades 15 to a substantially vertical orientation. At this stage, mating faces of a nacelle yaw bearing 87 and a tower top flange 89 are substantially parallel but are not contacting.

Holes for a bolted connection between tower top flange 89 and the nacelle yaw bearing 87 are aligned and guide bolts inserted.

The drive system 33 unlocks its drive motors and gradually lowers the rotor-nacelle assembly 11,9 vertically downwards so that the yaw bearing 87 engages the top flange 89. Once sufficient bolts are fitted to secure the rotor-nacelle assembly 11,9, the actuator 37 is disconnected at the hub end and the pivot pin 63 is removed, allowing the carriage 27 to return to the base of the tower.

The drive system 33 is actuated to drive the carriage 27 down the tower towards the base. When received at the base of the tower 3, the adjustable bearings 47 and drive gears 57,59 are disengaged from the rails 21a,21b, and the ship 71 returns to pick up the carriage 27, which can be reused.

Control of the carriage's 27 functions during elevation, rotation, disconnection and return of the carriage 27 is a combination of automatic control and manual intervention control via the remote-control console connected to the carriage 27 via the umbilical cable.

Figure 14A:
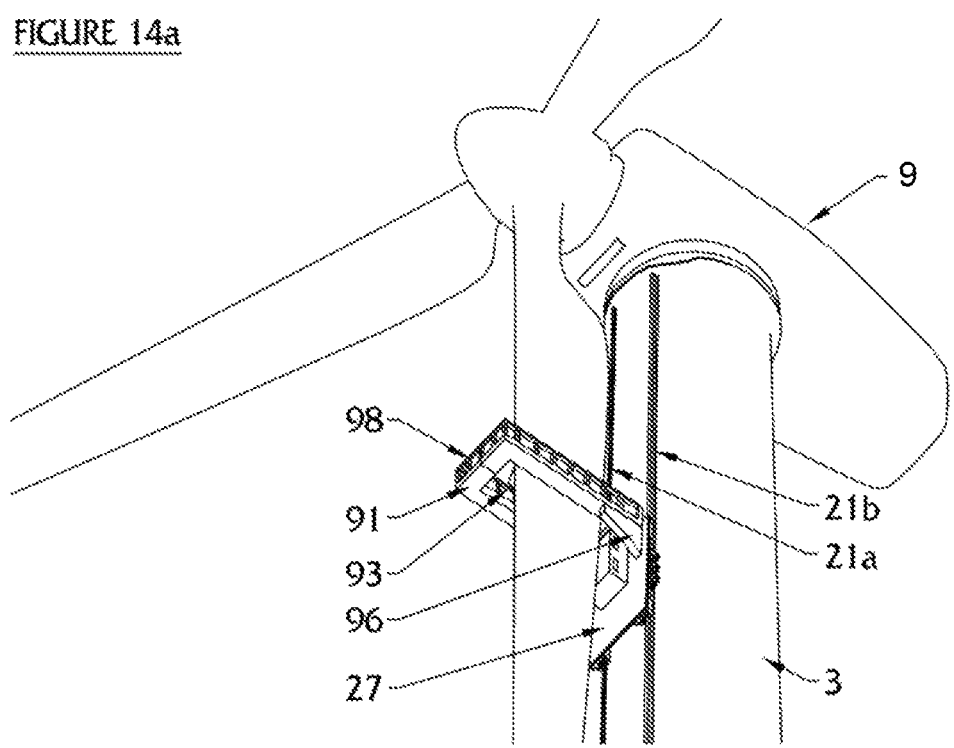
FIG. 14a is an isometric view of a carriage and rail system including a platform for maintenance work.

Optionally, the carriage 27 can be adapted to include a maintenance platform 91 (see FIG. 14). This enables maintenance work to be carried out on the wind turbine post installation, using the carriage 27 as an elevator for the platform 91. The platform 91 can include an aperture 93 that is arranged to receive a rotor blade 15. The rotor 11 can be locked in place to prevent rotation of the blades 15. One of the blades 15 can be oriented to depend substantially vertically downwardly (as shown in FIG. 14a). As the carriage 27 moves up the rails 21a,21b the blade 15 enters into the aperture 93. The carriage 27 can be locked off at the appropriate height along the rails to enable maintenance workers to inspect the rotor. The platform can be used to provide personnel access to the nacelle and for the transport of equipment and spare parts. With a suitable arrangement of the nacelle this could be used as a working platform to replace major components. Preferably the platform includes a safety rail 98.

Figure 14B:
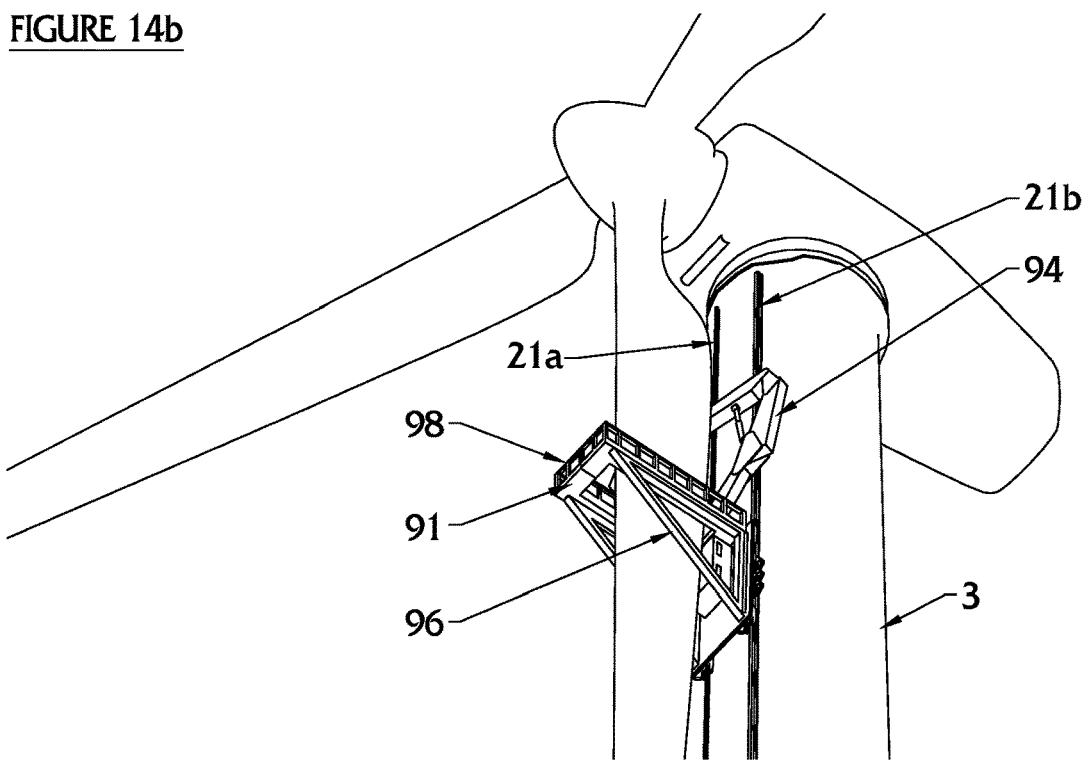
FIGS. 14b and 14c show alternative maintenance platforms, each including a crane.
Figure 14C:
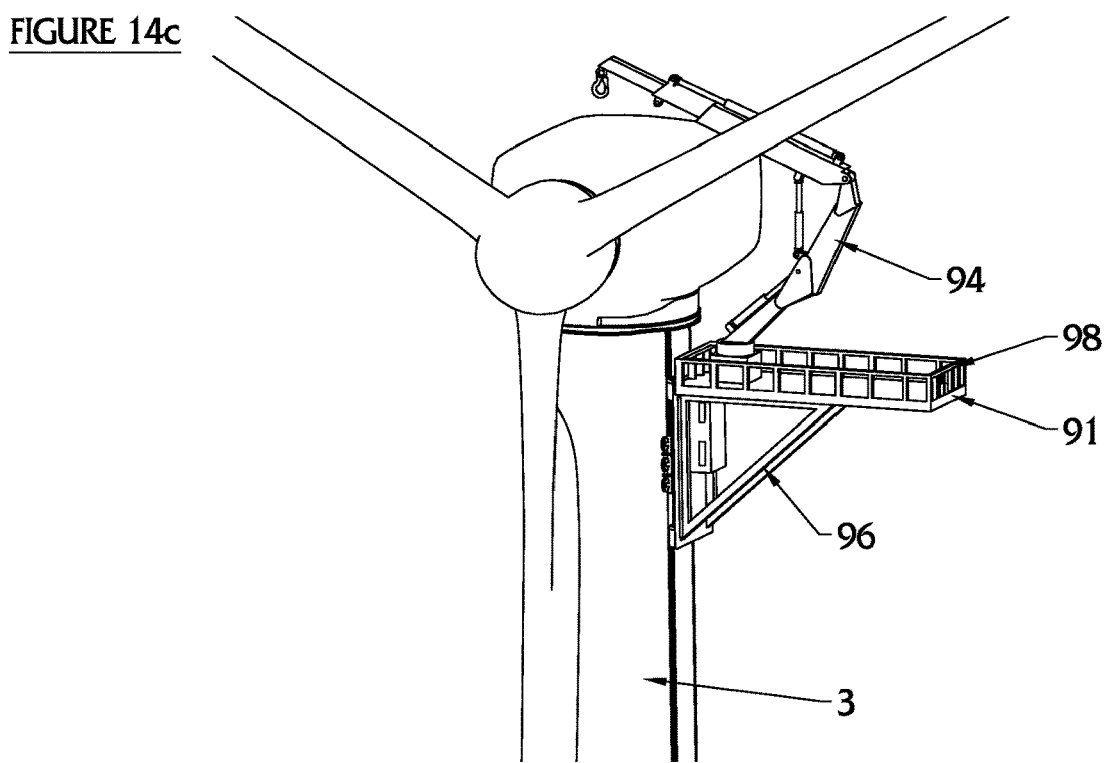

The platform can include maintenance equipment such as a crane 94 (see FIGS. 14b and 14c). Carriage supports 96 are provided to hold the platform in place. The platform includes a safety rail 98.

The advantages of the invention, for a typical windfarm installation are:

Reduced installation cost: the invention described is estimated to be competitive with current installation methods and will be considerably cheaper when installing wind turbines in deep water offshore sites or onshore wind turbines with high towers because it requires smaller, less expensive and more available installation equipment and will achieve a faster rate of installation.

Faster and less weather dependent installation: the invention described makes productive use of available weather windows, reducing the time period for installation and commissioning of a typical project and minimising downtime during major repairs on operational wind turbines.

Improved turbine availability: in the event of a major failure or planned re-fit the complete rotor nacelle assembly is quickly removed and replaced in one operation, allowing repairs to the failed unit to be carried out onshore and reducing downtime compared to in situ repair operations. This will lower risk and costs over the operational lifetime of a typical project.

Improved safety: reduced number of complex lifting operations and simplifies operations and maintenance on major components.

Overall, these factors combine to result in a substantial saving in the Levelised Cost of Energy (LCoE) for a typical offshore wind farm, as well as a more efficient and safer installation and maintenance operations.

Although the present invention has been described in connection with specific preferred embodiments, it should be understood that the invention as claimed should not be unduly limited to such specific embodiments. Furthermore, it will be apparent to the skilled person that modifications can be made to the above embodiment that fall within the scope of the invention.

Figure 15:
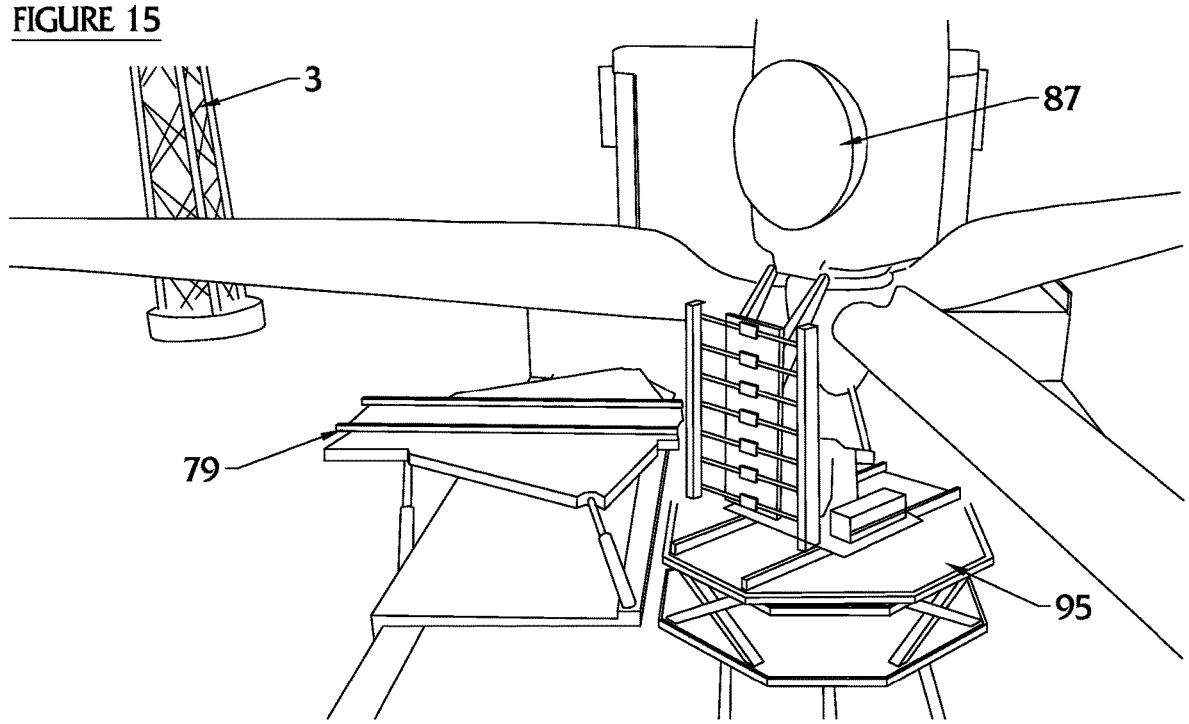
FIG. 15 illustrates transferring a carriage a rotor-nacelle assembly to a ship by means of the carriage.

For example, the carriage 27 can be used to transfer the rotor-nacelle assembly 11,9 on to the ship 71 (see FIG. 15).

Figure 16:
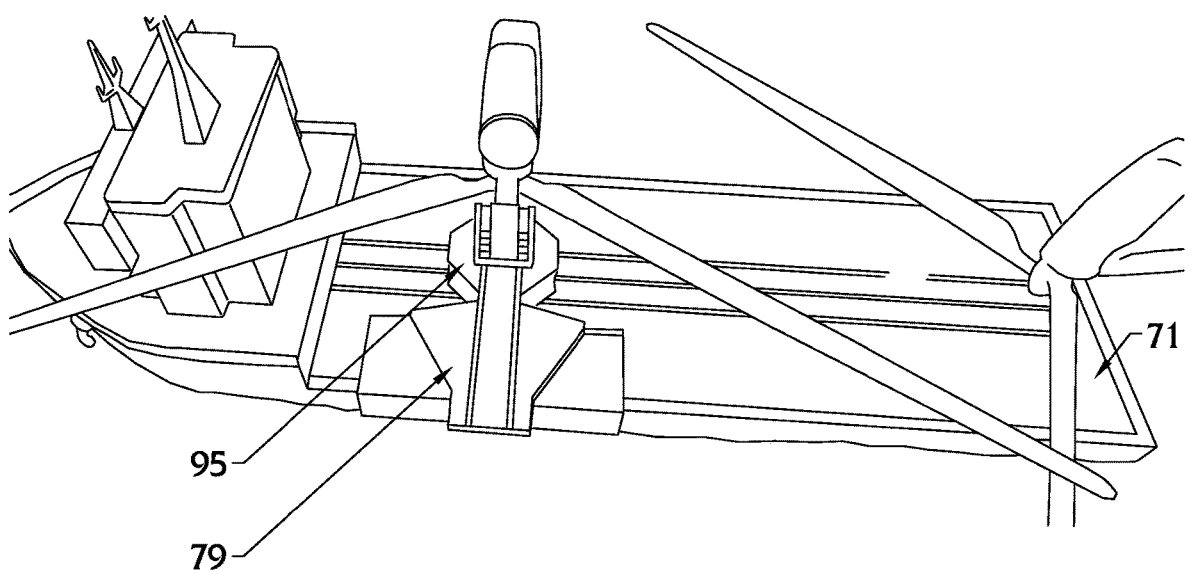
FIG. 16 shows a variant of the ship design wherein a movable platform is located at one side of the ship.

The ship 71 can include an elevator 95 for lifting the carriage-rotor-nacelle assembly 27,11,9 to the level of the movable platform 79 (see FIGS. 15 and 16). The elevator 95 can be used in addition, or as an alternative, to the ramp 85.

The movable platform 79 can be mounted at the side of the ship, for example to a port or starboard side of the ship (see FIG. 16).

The rails 21a,21b on the tower can be arranged and fixed to the tower wall in various ways to optimise manufacturing and to have minimum effect on the dynamics and long-term operation of the tower. For example, the pair of rails 21a,21b can be replaced with a single rail. The single rail can have a T-shaped cross-section. The carriage 27 can include stabilizers for maintaining the orientation of the carriage-rotor-nacelle assembly 27,11,9 with respect to the tower 3.

A tripod lattice tower can be used rather than the more conventional tubular tower. T-shaped rails can be fixed onto each leg of the tower and the three 'faces' of the tower provide increased flexibility for the vessel to offload the carriage-rotor-nacelle assembly 27,11,9 depending upon weather conditions.

Figure 17:
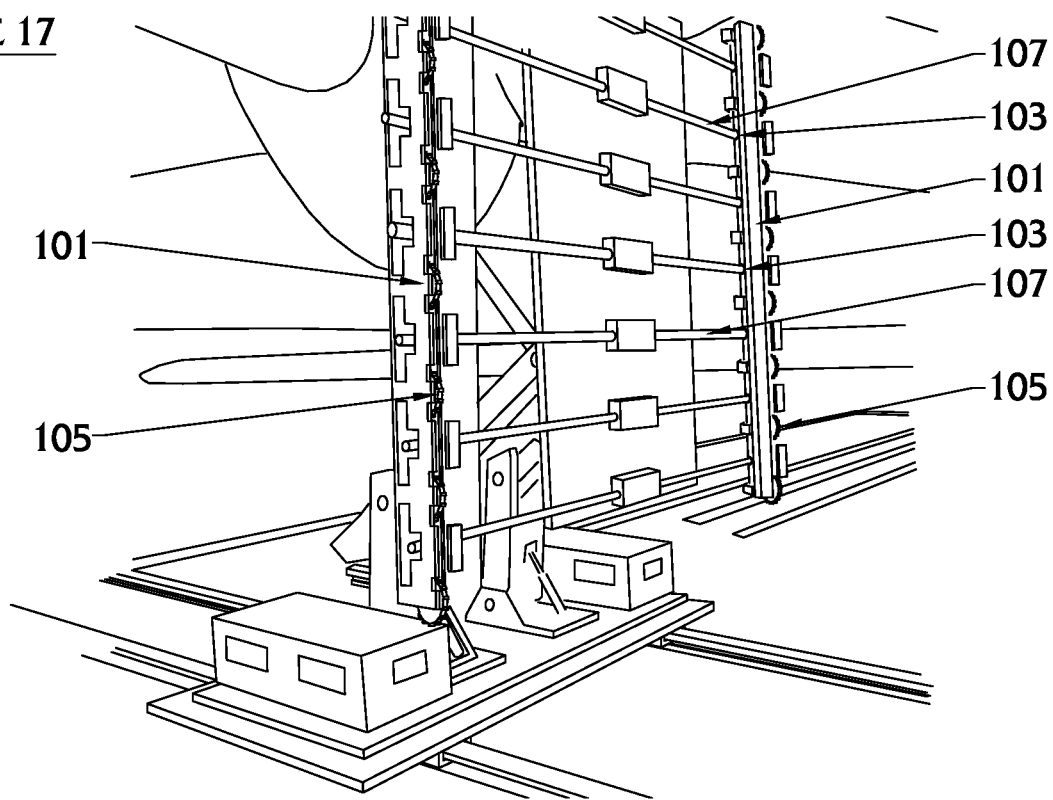
FIG. 17 shows a variant of the carriage, wherein drive units are mounted to a carriage frame in a manner that enables the positions of the drive units to be adjusted.

For some towers the distance between the first and second rails 21a,21b is not constant. For example, the distance between the rails 21a,21b may decrease close to the top 19 of the tower. To allow for the varying distance between the tower rails, the drive units 101 on the carriage 27 can be supported on sliding bearings 103 (see FIG. 17), so that the distance between the drive units 101 is adjustable while the carriage moves along the rails. For example, the distance between drive gears 105 associated with the first rail 21a and drive gears 105 associated with the second rail 21b is adjustable. The distance can be adjusted automatically by an actuator while the carriage moves along the rails. The carriage 27 can include an arrangement of rods 107. The rods 107 are arranged transversely to the direction of motion of the carriage. The drive units 101 include the sliding bearings 103. The sliding bearings 103 are mounted on to the rods 107. The position of the drive units 101 with respect to the rods is adjustable.

The drive system 33 shown is one of many alternative arrangements for a geared linear drive. The drive motors can be hydraulic or electric, transmitting drive torque to the pinion gears either directly or via a step-down transmission system.

Other types of driver 37 can be used. For example, the driver 37 for rotating the rotor-nacelle assembly 11,9 can include at least one electric linear actuator.

The bearings 41,47 that allow linear movement of the carriage 27 along the tower rails 21a,21b under load can be sliding bearings, for example PTFE pads.

For onshore wind turbine assembly, the main components of the rotor-nacelle assembly 11,9 (nacelle 9, hub 13, and blades 15) are generally transported to a site as separate components. The carriage 27 can also be transported to site separately.

A carriage-nacelle assembly 27,9 can be assembled on site, by attaching the carriage 27 to the nacelle 9. The carriage-nacelle assembly 27,9 can be mounted onto the tower 3 with or without the rotor 11 being attached to the nacelle 9. In the latter case, the rotor 11 is attached to the nacelle 9 while the carriage-nacelle assembly 27,9 is mounted on the tower to produce a carriage-rotor-nacelle assembly 27,11,9. The carriage-rotor-nacelle assembly 27,11,9 is then elevated to the top of the tower.

Rails 21a,21b having a different cross-section can be used instead of a T-shaped cross-section.

A different number of elevator rails 21a,21b can be used. For example the tower can use a single elevator rail, three or four rails. Any practicable number of rails can be used.

The invention claimed is:

1. A method for assembling a wind turbine, comprising:
providing a nacelle elevator system comprising a nacelle elevator carriage;
providing a nacelle configured to receive a rotor for rotation about a rotor axis and for connection to, or comprising, a yaw bearing to allow rotation of the rotor axis about a yaw axis;
pivotally and releasably attaching the nacelle elevator carriage to the nacelle to form a carriage-nacelle assembly such that the nacelle is pivotable at receiving formations about a pivot axis with respect to the nacelle elevator carriage, the pivot axis perpendicular to the yaw axis; and
mounting the carriage-nacelle assembly as a unit on to a side of a wind turbine tower at a first position.

2. The method according to claim 1, wherein the wind turbine tower comprises at least one elevator rail arranged along the length of the wind turbine tower, wherein the nacelle elevator carriage comprises a drive system for moving the nacelle elevator carriage along the at least one elevator rail, and wherein the method further comprises activating the drive system to move the carriage-nacelle assembly, or carriage-rotor-nacelle assembly, up the wind turbine tower from the first position to a second position adjacent the top of the wind turbine tower.

3. The method according to claim 1, wherein the method further comprises disengaging the nacelle elevator carriage from the nacelle.

4. A wind turbine nacelle configured for mounting onto the top of a wind turbine tower,
wherein the wind turbine nacelle is provided with receiving formations configured releasably to form a releasable pivot connection with a carriage of a nacelle elevator system such that the wind turbine nacelle is supported by the carriage and pivotable at receiving formations about a pivot axis with respect to the carriage, and
the wind turbine nacelle is configured to receive a rotor for rotation about a rotor axis and is configured for connection to, or comprising, a yaw bearing to allow rotation of the rotor axis about a yaw axis that is perpendicular to the pivot axis.

5. The wind turbine nacelle according to claim 4, wherein the receiving formations are configured releasably to receive a pivot pin for pivotally connecting and disconnecting the releasable pivot connection between the wind turbine nacelle to the carriage.

6. The wind turbine nacelle according to claim 5, wherein the receiving formations comprise at least one nacelle flange for releasably receiving the pivot pin for pivotally connecting and disconnecting the releasable pivot connection between the wind turbine nacelle and the carriage.

7. The wind turbine nacelle according to claim 4, wherein:
the receiving formations are located at or adjacent the center of gravity of the wind turbine nacelle; or the wind turbine nacelle is provided with the rotor and the receiving formations are located at or adjacent the center of gravity of the rotor-nacelle assembly.

8. The wind turbine nacelle according to claim 4, comprising a nacelle casing, wherein the nacelle casing is provided with the receiving formations.

9. The wind turbine nacelle according to claim 4, wherein the wind turbine nacelle comprises the yaw bearing.

10. A nacelle-carriage system comprising:
a wind turbine nacelle according to claim 4; and a nacelle elevator system comprising an elevator carriage for mounting on the side of the wind turbine tower and for forming the releasable pivot connection with the receiving formations of the wind turbine nacelle to support the wind turbine nacelle.

11. The nacelle-carriage system according to claim 10, comprising a pivot pin for pivotally connecting and disconnecting the releasable pivot connection between the receiving formations of the wind turbine nacelle and the elevator carriage.

12. The nacelle-carriage system according to claim 11, comprising a pivot pin actuator for removing the pivot pin to separate the wind turbine nacelle and the elevator carriage.

13. The nacelle-carriage system according to claim 10, wherein the elevator carriage comprises a chassis and a driver for pivoting the wind turbine nacelle with respect to the chassis.

14. The nacelle-carriage system according to claim 13, wherein the driver is configured to pivot the wind turbine nacelle from a substantially vertical orientation of the rotor axis to a substantially horizontal orientation of the rotor axis.

15. The nacelle-carriage system according to claim 10, wherein the elevator carriage comprises:
a rail attachment system for attaching the elevator carriage to rails extending up the wind turbine tower; and
a drive system for moving the elevator carriage along the rails.

16. The nacelle-carriage system according to claim 15, wherein the rail attachment system is provided with gears for releasably engaging with the rails of the wind turbine tower.

17. The nacelle-carriage system according to claim 10, wherein the elevator carriage is provided with a connector arm for releasably pivotally attaching the elevator carriage to the receiving formations of the wind turbine nacelle.

18. The nacelle-carriage system according to claim 17, wherein the elevator carriage comprises a chassis having a first side provided with a rail attachment system for attaching the carriage to rails of the wind turbine tower, and having an opposed second side, and wherein the connector arm projects away from second side of the chassis.

19. A wind turbine system comprising:
a nacelle-carriage system according to claim 10; and
the wind turbine tower configured for mounting the elevator carriage of the nacelle elevator system on to a side of the wind turbine tower.

20. A method of assembling a wind turbine, comprising:
supporting a wind turbine nacelle according to claim 4 on a carriage of a nacelle elevator system that is mounted on a side of the wind turbine tower by the releasable pivot connection between the carriage and the receiving formations of the wind turbine nacelle; and
connecting the wind turbine nacelle to the top of the wind turbine tower, comprising pivoting the wind turbine nacelle at the receiving formations about the pivot axis with respect to the carriage.

21. The method according to claim 20, further comprising:
releasing the carriage from the wind turbine nacelle at the top of the wind turbine tower, and
lowering the carriage from the top of the wind turbine tower.

22. A method of disassembling a wind turbine, comprising:
supporting a wind turbine nacelle according to claim 4 on a carriage of a nacelle elevator system that is mounted on a side of a wind turbine tower by the releasable pivot connection between the carriage and the receiving formations of the wind turbine nacelle; and
disconnecting the wind turbine nacelle from the top of the wind turbine tower, comprising pivoting the wind turbine nacelle at the receiving formations about the pivot axis with respect to the carriage.

* * * * *